United States Patent
Tsai et al.

(10) Patent No.: US 11,025,925 B2
(45) Date of Patent: Jun. 1, 2021

(54) CONDENSED CODING BLOCK HEADERS IN VIDEO CODING SYSTEMS AND METHODS

(71) Applicant: RealNetworks, Inc., Seattle, WA (US)

(72) Inventors: Chia-Yang Tsai, Bellevue, WA (US); Weijia Zhu, Seattle, WA (US); Kai Wang, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 0 days.

(21) Appl. No.: 16/493,695

(22) PCT Filed: Mar. 15, 2017

(86) PCT No.: PCT/CN2017/076807
§ 371 (c)(1),
(2) Date: Sep. 12, 2019

(87) PCT Pub. No.: WO2018/165917
PCT Pub. Date: Sep. 20, 2018

(65) Prior Publication Data
US 2020/0036986 A1    Jan. 30, 2020

(51) Int. Cl.
*H04N 19/176* (2014.01)
*H04N 19/119* (2014.01)
*H04N 19/159* (2014.01)
*H04N 19/182* (2014.01)

(52) U.S. Cl.
CPC ......... *H04N 19/176* (2014.11); *H04N 19/119* (2014.11); *H04N 19/159* (2014.11); *H04N 19/182* (2014.11)

(58) Field of Classification Search
CPC .. H04N 19/176; H04N 19/119; H04N 19/159; H04N 19/182; H04N 19/61; H04N 19/70; H04N 19/196; H04N 19/96
See application file for complete search history.

(56) References Cited

U.S. PATENT DOCUMENTS

| | | |
|---|---|---|
| 8,990,518 B2 | 3/2015 | Nystad et al. |
| 9,166,618 B2 | 10/2015 | Cideciyan |
| 2012/0039383 A1* | 2/2012 | Huang .................. H04N 19/176 375/240.02 |
| 2013/0195352 A1 | 8/2013 | Nystad et al. |

FOREIGN PATENT DOCUMENTS

| | | |
|---|---|---|
| EP | 1 422 944 A1 | 5/2004 |
| WO | 2009/049248 A2 | 4/2009 |

OTHER PUBLICATIONS

Bhavikatti, A.M. et al., FPGA Implementation of MAC Header Block of Transmitter for Wi-Fi, International Journal of Engineering Science and Technology, 9 pages.
"HM7: High Efficiency Video Coding (HEVC) Test Model 7 Encoder Description," JCT-VC Meeting; 100. MPEG Meeting; Apr. 27-May 7, 2012; Geneva.

* cited by examiner

*Primary Examiner* — Nam D Pham
(74) *Attorney, Agent, or Firm* — Seed IP Law Group LLP

(57) ABSTRACT

Provided herein are systems and methods for encoding an unencoded video frame of a sequence of video frames using a condensed coding header format. After a frame is divided into coding blocks and the visual data encoded, the coding block header data for each coding block is combined and encoded. A flag is set in the frame's frame header indicating whether the condensed or non-condensed coding block header format is being used.

12 Claims, 15 Drawing Sheets

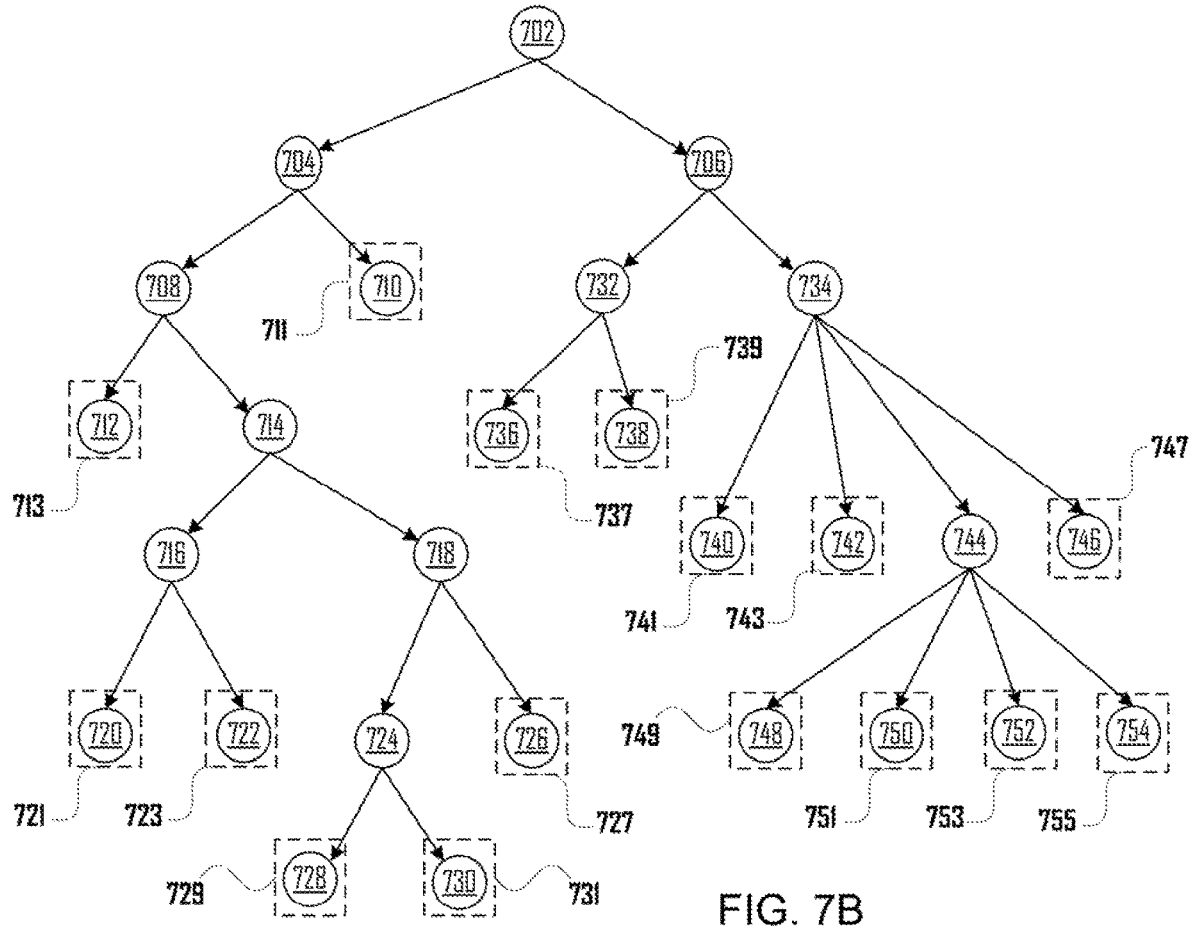

CONDENSED CODING BLOCK HEADERS IN VIDEO CODING SYSTEMS AND METHODS

FIELD

This disclosure relates to encoding and decoding of video signals, and more particularly, to selecting predictive motion vectors for frames of a video sequence.

BACKGROUND

The advent of digital multimedia such as digital images, speech/audio, graphics, and video have significantly improved various applications as well as opened up brand new applications due to relative ease by which it has enabled reliable storage, communication, transmission, and, search and access of content. Overall, the applications of digital multimedia have been many, encompassing a wide spectrum including entertainment, information, medicine, and security, and have benefited the society in numerous ways. Multimedia as captured by sensors such as cameras and microphones is often analog, and the process of digitization in the form of Pulse Coded Modulation (PCM) renders it digital. However, just after digitization, the amount of resulting data can be quite significant as is necessary to re-create the analog representation needed by speakers and/or TV display. Thus, efficient communication, storage or transmission of the large volume of digital multimedia content requires its compression from raw PCM form to a compressed representation. Thus, many techniques for compression of multimedia have been invented. Over the years, video compression techniques have grown very sophisticated to the point that they can often achieve high compression factors between 10 and 100 while retaining high psycho-visual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, smartphones, and wearable computing devices, fueling the desire for even higher levels of video compression. In the standards-body-driven standards, this is evidenced by the recently started effort by ISO MPEG in High Efficiency Video coding which is expected to combine new technology contributions and technology from a number of years of exploratory work on H.265 video compression by ITU-T standards committee.

All aforementioned standards employ a general intra/interframe predictive coding framework in order to reduce spatial and temporal redundancy in the encoded bit-stream. The basic concept of interframe prediction is to remove the temporal dependencies between neighboring pictures by using block matching method. At the outset of an encoding process, each frame of the unencoded video sequence is grouped into one of three categories: I-type frames, P-type frames, and B-type frames. I-type frames are intra-coded. That is, only information from the frame itself is used to encode the picture and no inter-frame motion compensation techniques are used (although intra-frame motion compensation techniques may be applied).

The other two types of frames, P-type and B-type, are encoded using inter-frame motion compensation techniques. The difference between P-picture and B-picture is the temporal direction of the reference pictures used for motion compensation. P-type pictures utilize information from previous pictures in display order, whereas B-type pictures may utilize information from both previous and future pictures in display order.

For P-type and B-type frames, each frame is then divided into blocks of pixels, represented by coefficients of each pixel's luma and chrominance components, and one or more motion vectors are obtained for each block (because B-type pictures may utilize information from both a future and a past coded frame, two motion vectors may be encoded for each block). A motion vector (MV) represents the spatial displacement from the position of the current block to the position of a similar block in another, previously encoded frame (which may be a past or future frame in display order), respectively referred to as a reference block and a reference frame. The difference between the reference block and the current block is calculated to generate a residual (also referred to as a "residual signal"). Therefore, for each block of an inter-coded frame, only the residuals and motion vectors need to be encoded rather than the entire contents of the block. By removing this kind of temporal redundancy between frames of a video sequence, the video sequence can be compressed.

To further compress the video data, after inter or intra frame prediction techniques have been applied, the coefficients of the residual signal are often transformed from the spatial domain to the frequency domain (e.g. using a discrete cosine transform ("DCT") or a discrete sine transform ("DST")). For naturally occurring images, such as the type of images that typically make up human perceptible video sequences, low-frequency energy is always stronger than high-frequency energy. Residual signals in the frequency domain therefore get better energy compaction than they would in spatial domain. After forward transform, the coefficients and motion vectors may be quantized and entropy encoded.

On the decoder side, inversed quantization and inversed transforms are applied to recover the spatial residual signal. These are typical transform/quantization process in all video compression standards. A reverse prediction process may then be performed in order to generate a recreated version of the original unencoded video sequence.

In past standards, the blocks used in coding were generally sixteen by sixteen pixels (referred to as macroblocks in many video coding standards). However, since the development of these standards, frame sizes have grown larger and many devices have gained the capability to display higher than "high definition" (or "HD") frame sizes, such as 2048×1530 pixels. Thus it may be desirable to have larger blocks to efficiently encode the motion vectors for these frame size, e.g. 64×64 pixels. However, because of the corresponding increases in resolution, it also may be desirable to be able to perform motion prediction and transformation on a relatively small scale, e.g. 4×4 pixels.

An encoder may generate a bit-stream corresponding to a complete frame that includes a picture header, followed by a first coding block header for the first coding block of the frame, followed by a first residual data block corresponding to the image data for the first coding block of the frame, followed by a second coding block header for the second coding block, followed by a second residual data block corresponding to the image data for the second coding block, followed by a third coding block header for the third coding block, followed by a third residual data block corresponding to the image data for the third coding block, etc.

The picture header may contain information relevant to a downstream decoder for decoding the complete frame. Similarly, each coding block header may contain the information relevant to a downstream decoder for decoding the upcoming coding block. For example, a coding block header may include code words relating to the coding block's split flag, encoding mode/coding block type, prediction information, motion information, and the like.

As the resolution of motion prediction increases, the amount of bandwidth required to encode and transmit motion vectors increases, both per frame and accordingly across entire video sequences.

BRIEF DESCRIPTION OF THE DRAWINGS

FIGS. 7A-C illustrate a schematic diagram of an exemplary application of the recursive coding block splitting schema illustrated in FIG. 6 in accordance with at least one embodiment.

DESCRIPTION

Figure 1:
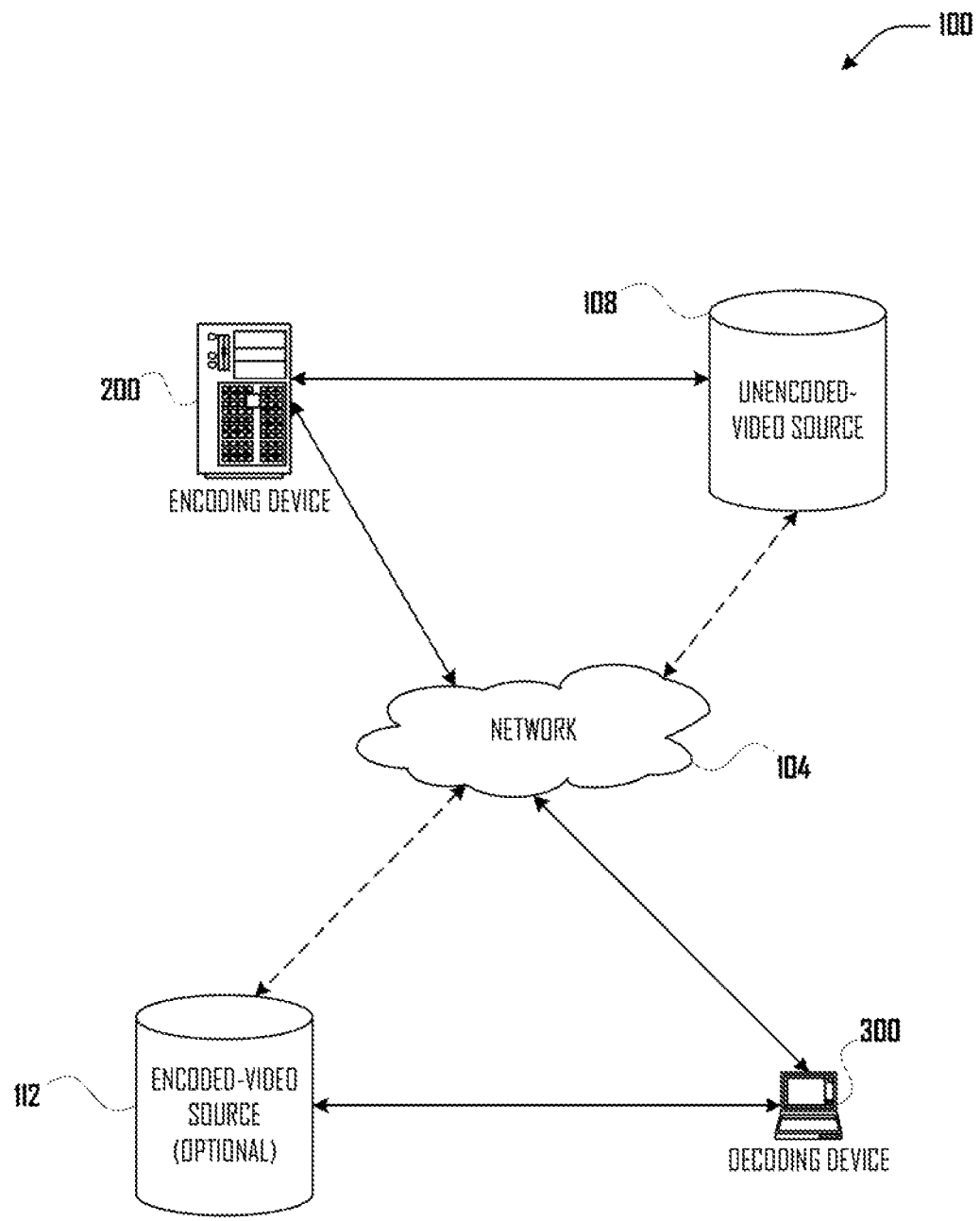
FIG. 1 illustrates an exemplary video encoding/decoding system according to at least one embodiment.

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The phrases "in one embodiment," "in at least one embodiment," "in various embodiments," "in some embodiments," and the like may be used repeatedly herein. Such phrases do not necessarily refer to the same embodiment. The terms "comprising," "having," and "including" are synonymous, unless the context dictates otherwise. Various embodiments are described in the context of a typical "hybrid" video coding approach, as was described generally above, in that it uses inter-/intra-picture prediction and transform coding.

Reference is now made in detail to the description of the embodiments as illustrated in the drawings. While embodiments are described in connection with the drawings and related descriptions, it will be appreciated by those of ordinary skill in the art that alternate and/or equivalent implementations may be substituted for the specific embodiments shown and described, including all alternatives, modifications, and equivalents, whether or not explicitly illustrated and/or described, without departing from the scope of the present disclosure. In various alternate embodiments, additional devices, or combinations of illustrated devices, may be added to, or combined, without limiting the scope to the embodiments disclosed herein.

Exemplary Video Encoding/Decoding System

FIG. 1 illustrates an exemplary video encoding/decoding system 100 in accordance with at least one embodiment. Encoding device 200 (illustrated in FIG. 2 and described below) and decoding device 300 (illustrated in FIG. 3 and described below) are in data communication with a network 104. Encoding device 200 may be in data communication with unencoded video source 108, either through a direct data connection such as a storage area network ("SAN"), a high speed serial bus, and/or via other suitable communication technology, or via network 104 (as indicated by dashed lines in FIG. 1). Similarly, decoding device 300 may be in data communication with an optional encoded video source 112, either through a direct data connection, such as a storage area network ("SAN"), a high speed serial bus, and/or via other suitable communication technology, or via network 104 (as indicated by dashed lines in FIG. 1). In some embodiments, encoding device 200, decoding device 300, encoded-video source 112, and/or unencoded-video source 108 may comprise one or more replicated and/or distributed physical or logical devices. In many embodiments, there may be more encoding devices 200, decoding devices 300, unencoded-video sources 108, and/or encoded-video sources 112 than are illustrated.

In various embodiments, encoding device 200, may be a networked computing device generally capable of accepting requests over network 104, e.g. from decoding device 300, and providing responses accordingly. In various embodiments, decoding device 300 may be a networked computing device having a form factor such as a mobile-phone; watch, glass, or other wearable computing device; a dedicated media player; a computing tablet; a motor vehicle head unit; an audio-video on demand (AVOD) system; a dedicated media console; a gaming device, a "set-top box," a digital video recorder, a television, or a general purpose computer. In various embodiments, network 104 may include the Internet, one or more local area networks ("LANs"), one or more wide area networks ("WANs"), cellular data networks, and/or other data networks. Network 104 may, at various points, be a wired and/or wireless network.

Exemplary Encoding Device

Figure 2:
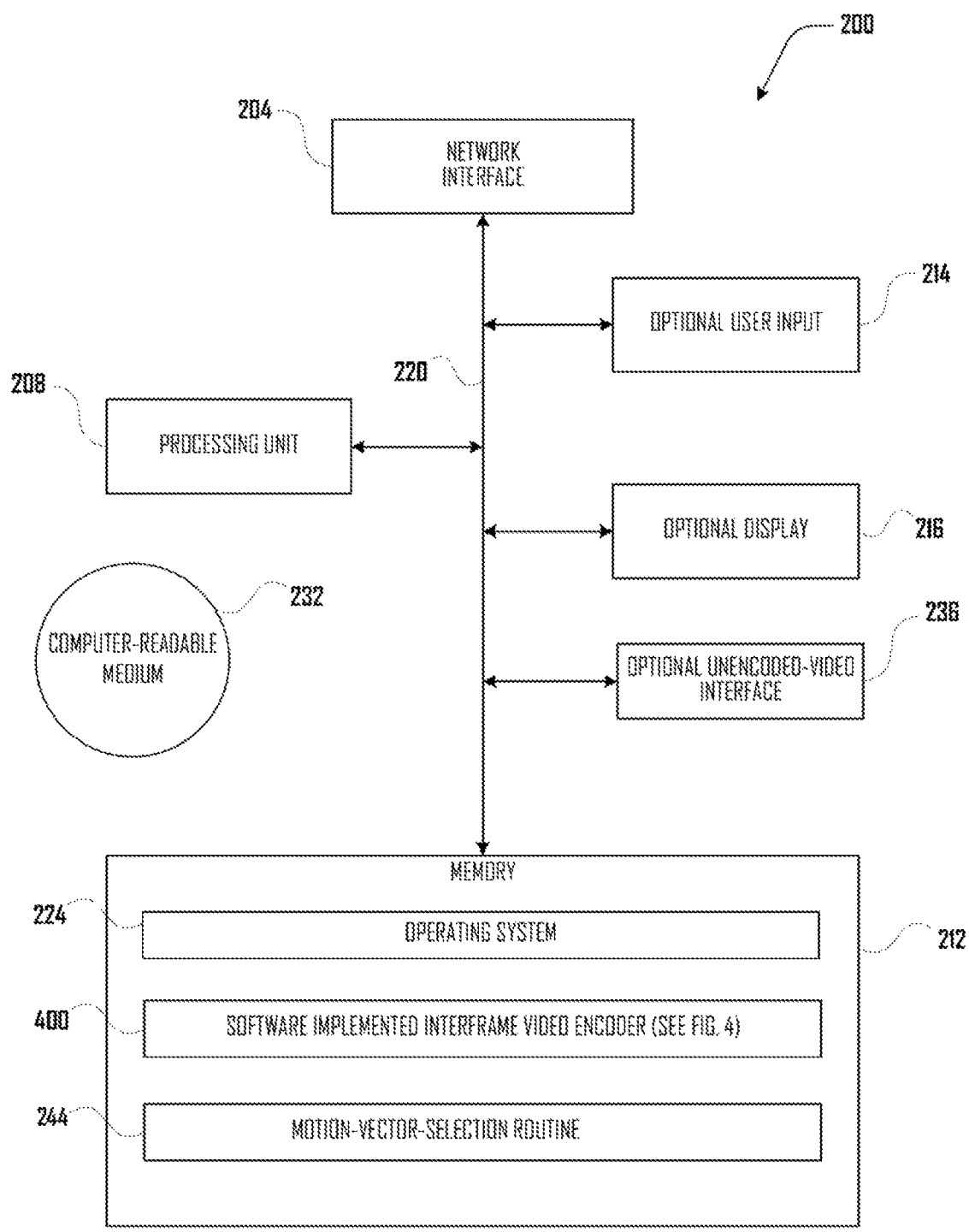
FIG. 2 illustrates a component block diagram of an exemplary encoding device, in accordance with at least one embodiment.

Referring to FIG. 2, several components of an exemplary encoding device 200 are illustrated. In some embodiments, an encoding device may include many more components than those shown in FIG. 2. However, it is not necessary that all of these generally conventional components be shown in order to disclose an illustrative embodiment. As shown in FIG. 2, exemplary encoding device 200 includes a network interface 204 for connecting to a network, such as network 104. Exemplary encoding device 200 also includes a processing unit 208, a memory 212, an optional user input 214 (e.g. an alphanumeric keyboard, keypad, a mouse or other pointing device, a touchscreen, and/or a microphone), and an optional display 216, all interconnected along with the network interface 204 via a bus 220. The memory 212 generally comprises a RAM, a ROM, and a permanent mass storage device, such as a disk drive, flash memory, or the like.

The memory 212 of exemplary encoding device 200 stores an operating system 224 as well as program code for a number of software services, such as software implemented interframe video encoder 400 (described below in reference to FIG. 4) with instructions for performing a motion-vector-selection routine 244. Memory 212 may also store video data files (not shown) which may represent unencoded copies of audio/visual media works, such as, by way of examples, movies and/or television episodes. These and other software components may be loaded into memory 212 of encoding device 200 using a drive mechanism (not shown) associated with a non-transitory computer-readable medium 232, such as a floppy disc, tape, DVD/CD-ROM drive, memory card, or the like. Although an exemplary encoding device 200 has been described, an encoding device may be any of a great number of networked computing devices capable of communicating with network 104 and executing instructions for implementing video encoding software, such as exemplary software implemented video encoder 400, and motion-vector-selection routine.

In operation, the operating system 224 manages the hardware and other software resources of the encoding device 200 and provides common services for software applications, such as software implemented interframe video encoder 400. For hardware functions such as network communications via network interface 204, receiving data via input 214, outputting data via display 216, and allocation of memory 212 for various software applications, such as software implemented interframe video encoder 400, operating system 224 acts as an intermediary between software executing on the encoding device and the hardware.

In some embodiments, encoding device 200 may further comprise a specialized optional unencoded video interface 236 for communicating with unencoded-video source 108, such as a high speed serial bus, or the like. In some embodiments, encoding device 200 may communicate with unencoded-video source 108 via network interface 204. In other embodiments, unencoded-video source 108 may reside in memory 212 or computer readable medium 232.

Although an exemplary encoding device 200 has been described that generally conforms to conventional general purpose computing devices, an encoding device 200 may be any of a great number of devices capable of encoding video, for example, a video recording device, a video co-processor and/or accelerator, a personal computer, a game console, a set-top box, a handheld or wearable computing device, a smart phone, or any other suitable device.

Encoding device 200 may, by way of example, be operated in furtherance of an on-demand media service (not shown). In at least one exemplary embodiment, the on-demand media service may be operating encoding device 200 in furtherance of an online on-demand media store providing digital copies of media works, such as video content, to users on a per-work and/or subscription basis. The on-demand media service may obtain digital copies of such media works from unencoded video source 108.

Exemplary Decoding Device

Figure 3:
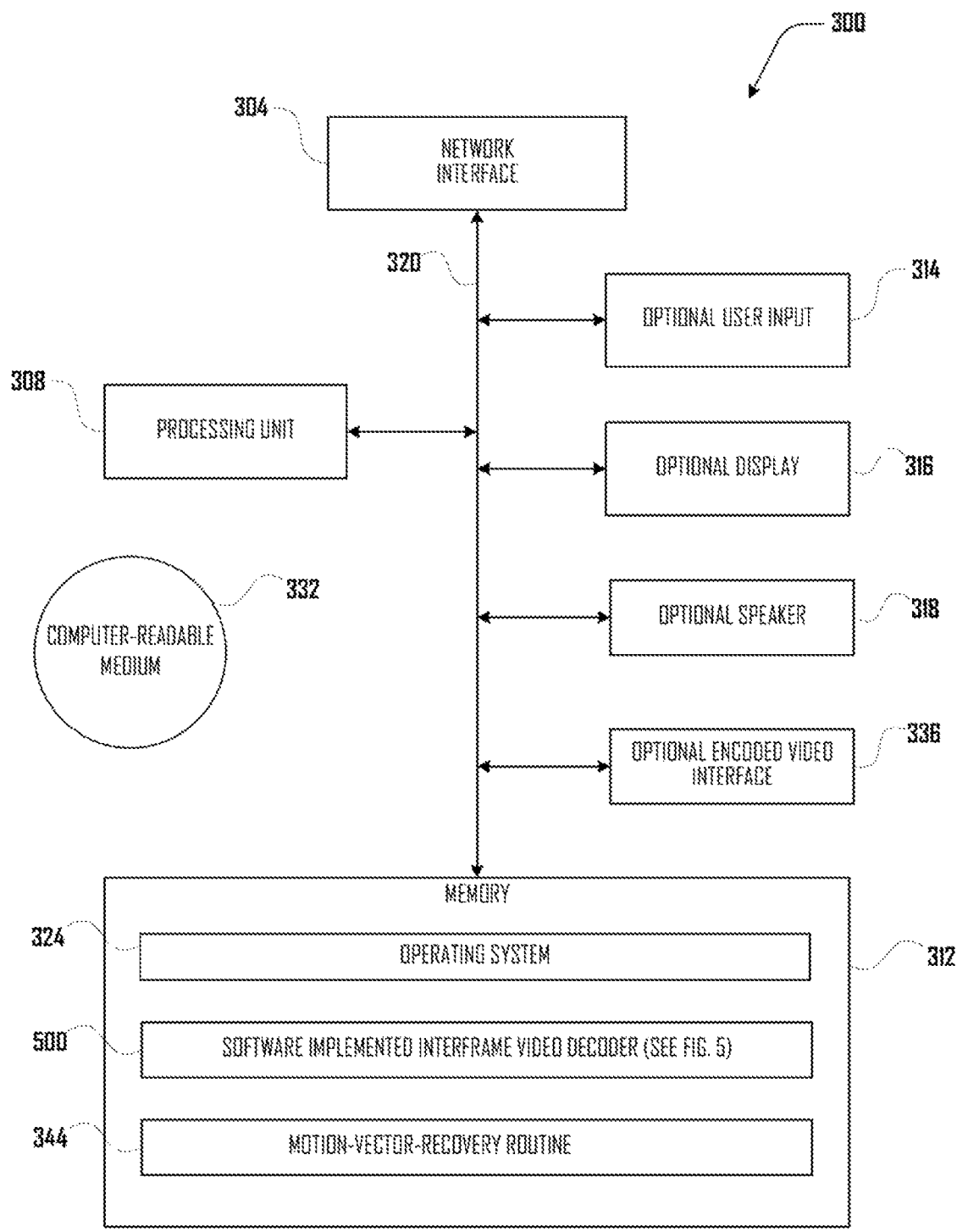
FIG. 3 illustrates a component block diagram of an exemplary decoding device, in accordance with at least one embodiment.

Referring to FIG. 3, several components of an exemplary decoding device 300 are illustrated. In some embodiments, a decoding device may include many more components than those shown in FIG. 3. However, it is not necessary that all of these generally conventional components be shown in order to disclose an illustrative embodiment. As shown in FIG. 3, exemplary decoding device 300 includes a network interface 304 for connecting to a network, such as network 104. Exemplary decoding device 300 also includes a processing unit 308, a memory 312, an optional user input 314 (e.g. an alphanumeric keyboard, keypad, a mouse or other pointing device, a touchscreen, and/or a microphone), an optional display 316, and an optional speaker 318, all interconnected along with the network interface 304 via a bus 320. The memory 312 generally comprises a RAM, a ROM, and a permanent mass storage device, such as a disk drive, flash memory, or the like.

The memory 312 of exemplary decoding device 300 may store an operating system 324 as well as program code for a number of software services, such as software implemented video decoder 500 (described below in reference to FIG. 5) with instructions for performing motion-vector recovery routine 344. Memory 312 may also store video data files (not shown) which may represent encoded copies of audio/visual media works, such as, by way of example, movies and/or television episodes. These and other software components may be loaded into memory 312 of decoding device 300 using a drive mechanism (not shown) associated with a non-transitory computer-readable medium 332, such as a floppy disc, tape, DVD/CD-ROM drive, memory card, or the like. Although an exemplary decoding device 300 has been described, a decoding device may be any of a great number of networked computing devices capable of communicating with a network, such as network 104, and executing instructions for implementing video decoding software, such as exemplary software implemented video decoder 500, and accompanying message extraction routine.

In operation, the operating system 324 manages the hardware and other software resources of the decoding device 300 and provides common services for software applications, such as software implemented video decoder 500. For hardware functions such as network communications via network interface 304, receiving data via input 314, outputting data via display 316 and/or optional speaker 318, and allocation of memory 312, operating system 324 acts as an intermediary between software executing on the encoding device and the hardware.

In some embodiments, decoding device 300 may further comprise an optional encoded video interface 336, e.g. for communicating with encoded-video source 112, such as a high speed serial bus, or the like. In some embodiments, decoding device 300 may communicate with an encoded-video source, such as encoded video source 112, via network interface 304. In other embodiments, encoded-video source 112 may reside in memory 312 or computer readable medium 332.

Although an exemplary decoding device 300 has been described that generally conforms to conventional general purpose computing devices, a decoding device 300 may be any of a great number of devices capable of decoding video, for example, a video recording device, a video co-processor and/or accelerator, a personal computer, a game console, a set-top box, a handheld or wearable computing device, a smart phone, or any other suitable device.

Decoding device 300 may, by way of example, be operated in furtherance of the on-demand media service. In at least one exemplary embodiment, the on-demand media service may provide digital copies of media works, such as video content, to a user operating decoding device 300 on a per-work and/or subscription basis. The decoding device may obtain digital copies of such media works from unencoded video source 108 via, for example, encoding device 200 via network 104.

Software Implemented Interframe Video Encoder

Figure 4:
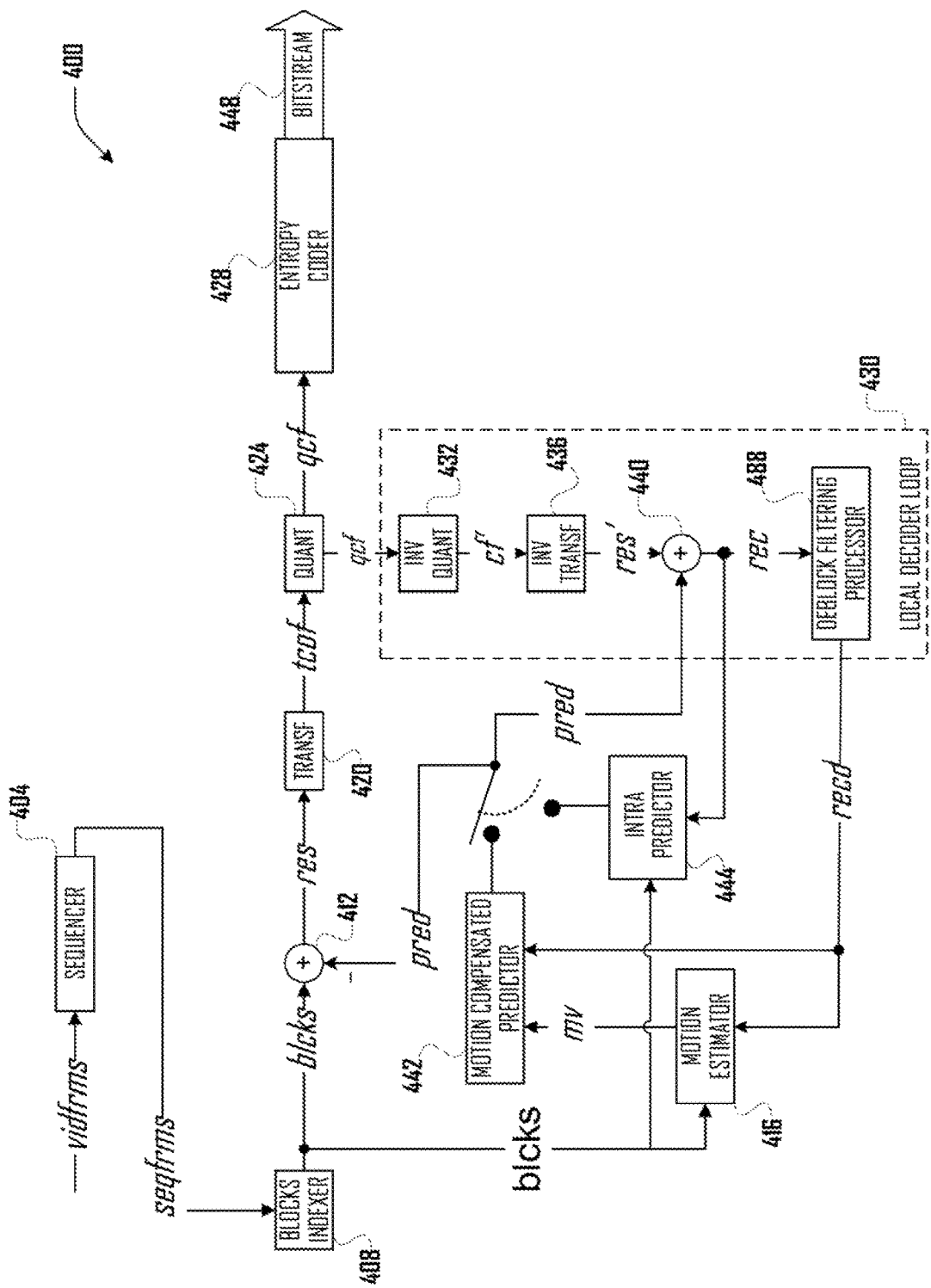
FIG. 4 illustrates a control flow diagram of an exemplary video encoder in accordance with at least one embodiment.

FIG. 4 shows a general functional block diagram of software implemented interframe video encoder 400 (hereafter "encoder 400") employing residual transformation techniques in accordance with at least one embodiment. One or more unencoded video frames (vidfrms) of a video sequence in display order may be provided to sequencer 404.

Sequencer 404 may assign a predictive-coding picture-type (e.g. I, P, or B) to each unencoded video frame and reorder the sequence of frames, or groups of frames from the sequence of frames, into a coding order for motion prediction purposes (e.g. I-type frames followed by P-type frames, followed by B-type frames). The sequenced unencoded video frames (seqfrms) may then be input in coding order to blocks indexer 408.

For each of the sequenced unencoded video frames (seqfrms), blocks indexer 408 may determine a largest coding block ("LCB") size for the current frame (e.g. sixty-four by sixty-four pixels) and divide the unencoded frame into an array of coding blocks (blcks). Individual coding blocks within a given frame may vary in size, e.g. from four by four pixels up to the LCB size for the current frame.

Each coding block may then be input one at a time to differencer 412 and may be differenced with corresponding prediction signal blocks (pred) generated from previously encoded coding blocks. To generate the prediction blocks (pred), coding blocks (blcks) are also be provided to an intra predictor 444 and a motion estimator 416. After differencing at differencer 412, a resulting residual block (res) may be forward-transformed to a frequency-domain representation by transformer 420 (discussed below), resulting in a block of transform coefficients (tcof). The block of transform coefficients (tcof) may then be sent to the quantizer 424 resulting in a block of quantized coefficients (qcf) that may then be sent both to an entropy coder 428 and to a local decoding loop 430.

For intra-coded coding blocks, intra predictor 444 provides a prediction signal representing a previously coded area of the same frame as the current coding block. For an inter-coded coding block, motion compensated predictor 442 provides a prediction signal representing a previously coded area of a different frame from the current coding block.

At the beginning of local decoding loop 430, inverse quantizer 432 may de-quantize the quantized coefficients (qcf) and pass the resulting de-quantized to inverse transformer 436 to generate a de-quantized residual block (res'). At adder 440, a prediction block (pred) from motion compensated predictor 442 or intra predictor 444 may be added to the de-quantized residual block (res') to generate a locally decoded block (rec). Locally decoded block (rec) may then be sent to a frame assembler and deblock filter processor 488, which reduces blockiness and assembles a recovered frame (recd), which may be used as the reference frame for motion estimator 416 and motion compensated predictor 442.

Entropy coder 428 encodes the quantized transform coefficients (qcf), differential motion vectors (dmv), and other data, generating an encoded video bit-stream 448. For each frame of the unencoded video sequence, encoded video bit-stream 448 may include encoded picture data (e.g. the encoded quantized transform coefficients (qcf) and differential motion vectors (dmv)) and an encoded frame header (e.g. syntax information such as the LCB size for the current frame).

Software Implemented Interframe Decoder

Figure 5:
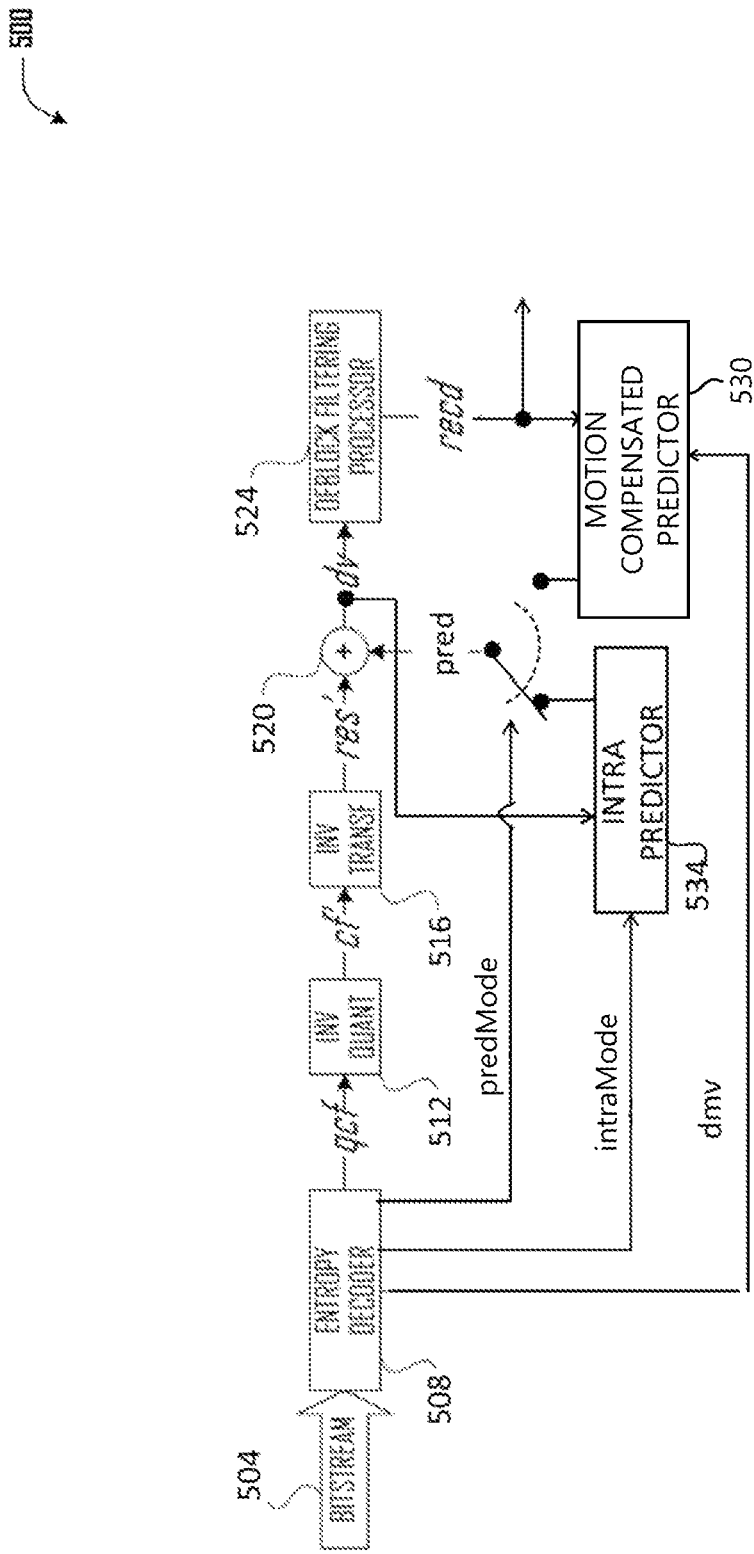
FIG. 5 illustrates a control flow of an exemplary video decoder in accordance with at least one embodiment.

FIG. 5 shows a general functional block diagram of a corresponding software implemented interframe video decoder 500 (hereafter "decoder 500") inverse residual transformation techniques in accordance with at least one embodiment and being suitable for use with a decoding device, such as decoding device 300. Decoder 500 may work similarly to the local decoding loop 430 at encoder 400.

Specifically, an encoded video bit-stream 504 to be decoded may be provided to an entropy decoder 508, which may decode blocks of quantized coefficients (qcf), differential motion vectors (dmv), accompanying message data packets (msg-data), and other data, including the prediction mode (intra or inter). The quantized coefficient blocks (qcf) may then be reorganized by an inverse quantizer 512, resulting in recovered transform coefficient blocks (cf'). Recovered transform coefficient blocks (cf') may then be inverse transformed out of the frequency-domain by an inverse transformer 516 (described below), resulting in decoded residual blocks (res'). An adder 520 may add motion compensated prediction blocks (pred) obtained by using corresponding motion vectors (dmv) from a motion compensated predictor 530 or from intra predictor 534. The resulting decoded video (dv) may be deblock-filtered in a frame assembler and deblock filtering processor 524. Blocks (recd) at the output of frame assembler and deblock filtering processor 524 form a reconstructed frame of the video sequence, which may be output from the decoder 500 and also may be used as the reference frame for a motion-compensated predictor 530 for decoding subsequent coding blocks.

Recursive Coding Block Splitting Schema

Figure 6:
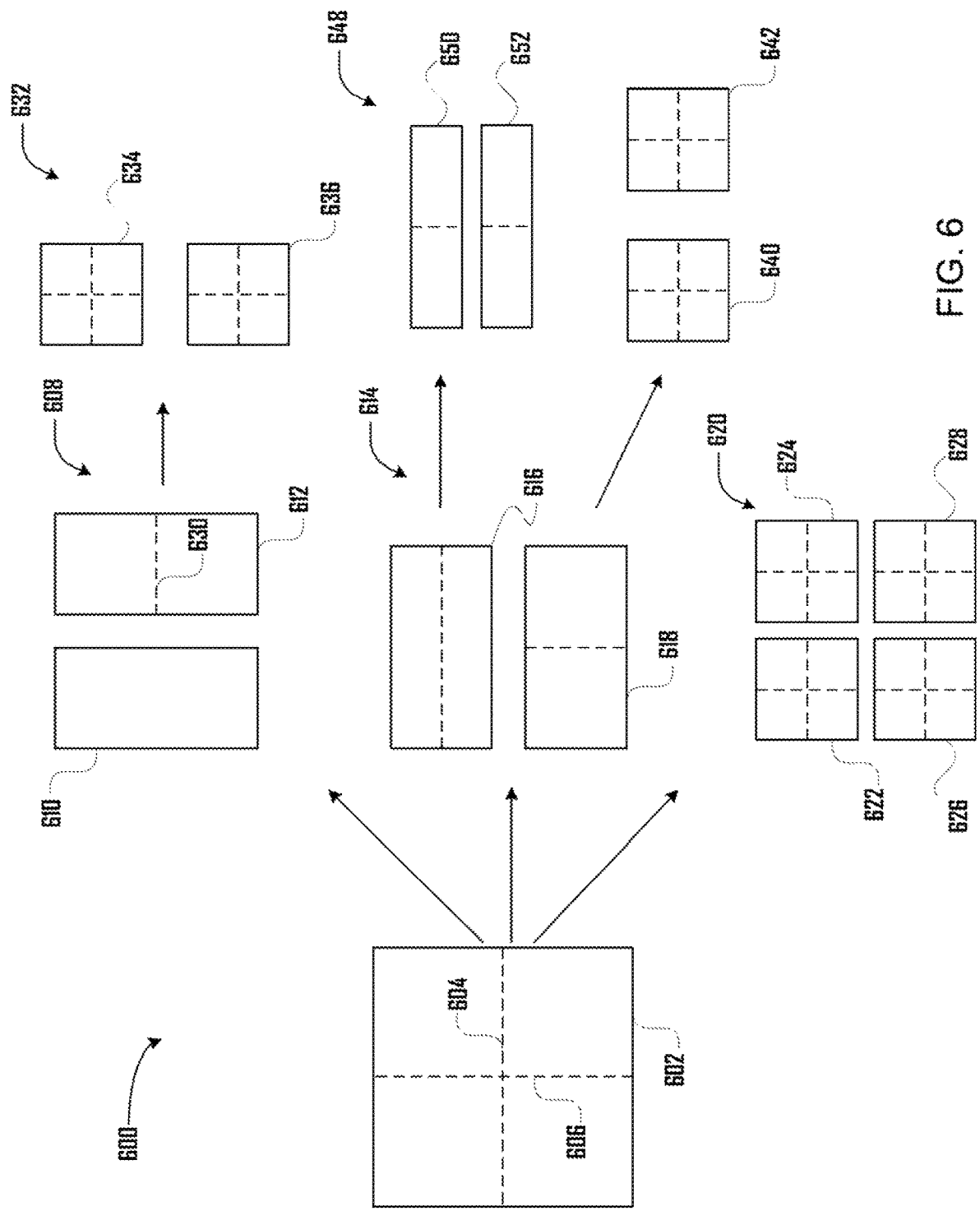
FIG. 6 illustrates a schematic diagram of an exemplary recursive coding block splitting schema in accordance with at least one embodiment.

FIG. 6 illustrates an exemplary recursive coding block splitting schema 600 that may be implemented by encoder 400 in accordance with various embodiments. At block indexer 408, after a frame is divided into LCB-sized regions of pixels, referred to below as coding block candidates ("CBCs") each LCB-sized coding block candidate ("LCBC") may be split into smaller CBCs according to recursive coding block splitting schema 600. This process may continue recursively until block indexer 408 determines (1) the current CBC is appropriate for encoding (e.g. because the current CBC contains only pixels of a single value) or (2) the current CBC is the minimum size for a coding block candidate for a particular implementation, e.g. 2×2, 4×4, etc., (an "MCBC"), whichever occurs first. Block indexer 408 may then index the current CBC as a coding block suitable for encoding.

A square CBC 602, such as an LCBC, may be split along one or both of vertical and horizontal transverse axes 604, 606. A split along vertical transverse axis 604 vertically splits square CBC 602 into a first rectangular coding block structure 608, as is shown by rectangular (1:2) CBCs 610 and 612. A split along horizontal transverse axis 606 horizontally spits square CBC 602 into a second rectangular coding block structure 614, as is shown by rectangular (2:1) CBCs 616 and 618, taken together.

A rectangular (2:1) CBC of first rectangular coding structure 614, such as CBC 616, may be split into a two rectangular coding block structure 648, as is shown by rectangular CBCs 650 and 652, taken together.

A split along both vertical and horizontal transverse axes 604, 606 splits square CBC 602 into a four square coding block structure 620, as is shown by square CBCs 622, 624, 626, and 628, taken together.

A rectangular (1:2) CBC of first rectangular coding block structure 608, such as CBC 612, may be split along a horizontal transverse axis 630 into a first two square coding block structure 632, as is shown by square CBCs 634 and 636, taken together.

A rectangular (2:1) CBC of second rectangular coding structure 614, such as CBC 618, may be split into a second two square coding block structure 638, as is shown by square CBCs 640 and 642, taken together.

A square CBC of four square coding block structure 620, the first two square coding block structure 632, or the second two square coding block structure 648, may be split along one or both of the coding block's vertical and horizontal transverse axes in the same manner as CBC 602.

For example, a 64×64 bit LCBC sized coding block may be split into two 32×64 bit coding blocks, two 64×32 bit coding blocks, or four 32×32 bit coding blocks.

In the encoded bit-stream, a two bit coding block split flag may be used to indicate whether the current coding block is split any further:

TABLE 1

| Coding Block Split Flag Value | Split Type |
|---|---|
| 00 | The current coding block is not split |
| 01 | The current coding block is horizontally split |
| 10 | The current coding block is vertically split |
| 11 | The current coding block is horizontally and vertically split |

Coding Block Tree Splitting Procedure

Figure 7A:
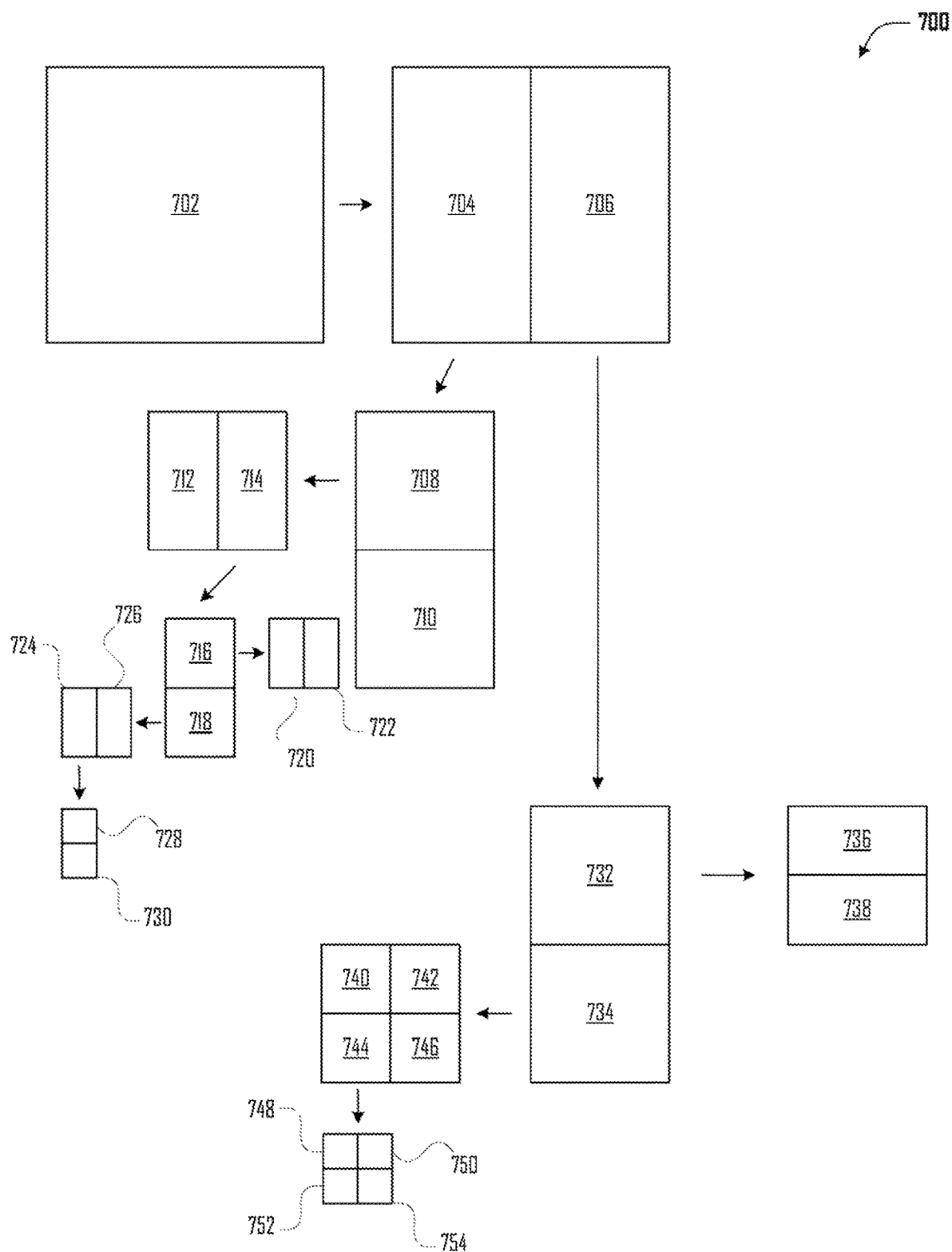

FIGS. 7A-7C illustrate an exemplary coding block tree splitting procedure 700 applying coding block splitting schema 600 to a "root" LCBC 702. FIG. 7A illustrates the various child coding blocks 704-754 created by coding block tree splitting procedure 700; FIG. 7B illustrates coding block tree splitting procedure as a tree data structure, showing the parent/child relationships between various coding blocks 702-754; FIG. 7C illustrates the various "leaf node" child coding blocks of FIG. 7B, indicated by dotted line, in their respective positions within the configuration of root coding block 702.

Assuming 64×64 LCBC 702 is not suitable for encoding, it may be split into ether first rectangular coding block structure 608, second rectangular coding structure 614, or four square coding block structure 620 of recursive coding block splitting schema 600, described above with reference to FIG. 6. For purposes of this example, it is assumed 64×64 LCBC 702 is split into two 32×64 child CBCs, 32×64 CBC 704 and 32×64 CBC 706. Each of these child CBCs may then be processed in turn.

Assuming the first child of 64×64 LCBC 702, 32×64 CBC 704, is not suitable for encoding, it may then be split into two child 32×32 coding block candidates, 32×32 CBC 708 and 32×32 CBC 710. Each of these child CBCs may then be processed in turn.

Assuming the first child of 32×64 CBC 704, 32×32 CBC 708, is not suitable for encoding, it may then be split into two child 16×32 coding block candidates, 16×32 CBC 712 and 16×32 CBC 714. Each of these child CBCs may then be processed in turn.

Encoder 400 may determine that the first child of 32×32 CBC 708, 16×32 CBC 712, is suitable for encoding; encoder 400 may therefore index 16×32 CBC 712 as a coding block 713 and return to parent 32×32 CBC 708 to process its next child, if any.

Assuming the second child of 32×32 CBC 708, 16×32 CBC 714, is not suitable for encoding, it may be split into two child 16×16 coding block candidates, 16×16 CBC 716 and 16×16 718. Each of these child CBCs may then be processed in turn.

Assuming the first child of 16×32 CBC 714, 16×16 CBC 716 is not suitable for encoding, it may be split into two child 8×16 coding block candidates, 8×16 CBC 720 and 8×16 CBC 722. Each of these child CBCs may then be processed in turn.

Encoder 400 may determine that the first child of 16×16 CBC 716, 8×16 CBC 720, is suitable for encoding; encoder 400 may therefore index 8×16 CBC 720 as a coding block 721 and return to parent 16×16 CBC 716, to process its next child, if any.

Encoder 400 may determine that the second child of 16×16 CBC 716, 8×16 CBC 722, is suitable for encoding; encoder 400 may therefore index 8×16 CBC 722 as a coding block 723 and return to parent 16×16 CBC 716, to process its next child, if any.

All children of 16×16 CBC 716 have now been processed, resulting in the indexing of 8×16 coding blocks 721 and 723. Encoder 400 may therefore return to parent 16×32 CBC 714 to process its next child, if any.

Assuming the second child of 16×32 CBC 714, 16×16 CBC 718, is not suitable for encoding, it may be split into two 8×16 coding block candidates, 8×16 CBC 724 and 8×16 CBC 726. Each of these child CBCs may then be processed in turn.

Assuming the first child of 16×16 CBC 718, 8×16 CBC 724, is not suitable for encoding, it may be split into two 8×8 coding block candidates, 8×8 CBC 728 and 8×8 CBC 730. Each of these child CBCs may then be processed in turn.

Encoder 400 may determine that the first child of 8×16 CBC 724, 8×8 CBC 728, is suitable for encoding; encoder 400 may therefore index 8×8 CBC 728 as a coding block 729 and then return to parent 8×16 CBC 724, to process its next child, if any.

Encoder 400 may determine that the second child of 8×16 CBC 724, 8×8 CBC 730, is suitable for encoding; encoder 400 may therefore index 8×8 CBC 730 as a coding block 731 and then return to parent 8×16 CBC 724, to process its next child, if any.

All children of 8×16 CBC 724 have now been processed, resulting in the indexing of 8×8 coding blocks 729 and 731. Encoder 400 may therefore return to parent 16×16 CBC 718 to process its next child, if any.

Encoder 400 may determine that the second child of 16×16 CBC 718, 8×16 CBC 726, is suitable for encoding; encoder 400 may therefore index 8×16 CBC 726 as a coding block 727 and then return to parent 16×16 CBC 718 to process its next child, if any.

All children of 16×16 CBC 718 have now been processed, resulting in the indexing of 8×8 coding blocks 729 and 731 and 8×16 coding block 727. Encoder 400 may therefore return to parent, 16×32 CBC 714 to process its next child, if any.

All children of 16×32 CBC 714 have now been processed, resulting in the indexing of 8×8 coding blocks 729 and 731, 8×16 coding blocks 721, 723, and 727. Encoder 400 may therefore return to parent 32×32 CBC 708 to process its next child, if any.

All children of 32×32 CBC 708 have now been processed, resulting in the indexing of 8×8 coding blocks 729 and 731, 8×16 coding blocks 721, 723, and 727, and 16×32 coding block 713. Encoder 400 may therefore return to parent 32×64 CBC 704 to process its next child, if any.

Encoder 400 may determine that the second child 32×64 CBC 704, 32×32 CBC 710 is suitable for encoding; encoder 400 may therefore index 32×32 CBC 710 as a coding block 711 and then return to parent 32×64 CBC 704 to process its next child, if any.

All children of 32×64 CBC 704 have now been processed, resulting in the indexing of 8×8 coding blocks 729 and 731; 8×16 coding blocks 721, 723, and 727; 16×32 coding block 713; and 32×32 coding block 711. Encoder 400 may therefore return to parent, root 64×64 LCBC 702 to process its next child, if any.

Assuming the second child of 64×64 LCBC 702, 32×64 CBC 706, is not suitable of encoding, it may be split into two 32×32 coding block candidates, 32×32 CBC 732 and 32×32 CBC 734. Each of these child CBCs may then be processed in turn.

Assuming the first child of 32×64 CBC 706, 32×32 CBC 732, is not suitable for encoding, it may be split into two 32×16 coding block candidates, 32×16 CBC 736 and 32×16 CBC 738. Each of these child CBCs may then be processed in turn.

Encoder 400 may determine that the first child of 32×32 CBC 732, 32×16 CBC 736, is suitable for encoding; encoder 400 may therefore index 32×16 CBC 736 as a coding block 737 and then return to parent 32×32 CBC 732 to process its next child, if any.

Encoder 400 may determine that the second child of 32×32 CBC 732, 32×16 CBC 738, is suitable for encoding; encoder 400 may therefore index 32×16 CBC 738 as a coding block 739 and then return to parent, 32×32 CBC 732 to process its next child, if any.

All children of 32×32 CBC 732 have now been processed, resulting in the indexing of 32×16 coding blocks 737 and 739. Encoder 400 may therefore return to parent 32×64 CBC 706 to process its next child, if any.

Assuming the second child of 32×64 CBC 706, 32×32 CBC 734, is not suitable for encoding, it may be split into four 16×16 coding block candidates, 16×16 CBC 740, 16×16 CBC 742, 16×16 CBC 744, and 16×16 CBC 746. Each of these child CBCs may then be processed in turn.

Encoder 400 may determine that the first child of 32×32 CBC 734, 16×16 CBC 740, is suitable for encoding; encoder 400 may therefore index 16×16 CBC 740 as a coding block 741 and then return to parent 32×32 CBC 734 to process its next child, if any.

Encoder 400 may determine that the second child of 32×32 CBC 734, 16×16 CBC 742, is suitable for encoding; encoder 400 may therefore index 16×16 CBC 742 as a coding block 743 and then return to parent 32×32 CBC 734 to process its next child, if any.

Assuming the third child of 32×32 CB, 16×16 CBC 744, is not suitable for encoding, it may be split into four 8×8 coding block candidates, 8×8 CBC 748, 8×8 CBC 750, 8×8 CBC 752, and 8×8 CBC 754. Each of these child CBCs may then be processed in turn.

Encoder 400 may determine that the first child of 16×16 CBC 744, 8×8 CBC 748, is suitable for encoding; encoder 400 may therefore index 8×8 CBC 748 as a coding block 749 and then return to parent 16×16 CBC 744 to process its next child, if any.

Encoder 400 may determine that the second child of 16×16 CBC 744, 8×8 CBC 750, is suitable for encoding; encoder 400 may therefore index 8×8 CBC 750 as a coding block 751 and then return to parent 16×16 CBC 744 to process its next child, if any.

Encoder 400 may determine that the third child of 16×16 CBC 744, 8×8 CBC 752, is suitable for encoding; encoder 400 may therefore index 8×8 CBC 752 as a coding block 753 and then return to parent 16×16 CBC 744, to process its next child, if any.

Encoder 400 may determine that the fourth child of 16×16 CBC 744, 8×8 CBC 754, is suitable for encoding; encoder 400 may therefore index 8×8 CBC 754 as a coding block 755 and then return to parent 16×16 CBC 744 to process its next child, if any.

All children of 16×16 CBC 744 have now been processed, resulting in 8×8 coding blocks 749, 751, 753, and 755. Encoder 400 may therefore return to parent 32×32 CBC 734 to process its next child, if any.

Encoder 400 may determine that the fourth child of 32×32 CBC 734, 16×16 CBC 746, is suitable for encoding; encoder 400 may therefore index 16×16 CBC 746 as a coding block 747 and then return to parent 32×32 CBC 734 to process its next child, if any.

All children of 32×32 CBC 734 have now been processed, resulting in the indexing of 16×16 coding blocks 741, 743, and 747 and 8×8 coding blocks 749, 751, 753, and 755. Encoder 400 may therefore return to parent 32×64 CBC 706 to process its next child, if any.

All children of 32×64 CBC 706 have now been processed, resulting in the indexing of 32×16 coding blocks 737 and 739; 16×16 coding blocks 741, 743, and 747; and 8×8 coding blocks 749, 751, 753, and 755. Encoder 400 may therefore return to parent, root 64×64 LCBC 702, to process its next child, if any.

All children of root 64×64 LCBC 702 have now been processed, resulting in the indexing of 8×8 coding blocks 729, 731, 749, 751, 753, and 755; 8×16 coding blocks 721, 723, and 727; 16×32 coding block 713, 32×32 coding block 711; 32×16 coding blocks 737 and 739; and 16×16 coding blocks 741, 743, and 747. Encoder 400 may therefore proceed to the next LCBC of the frame, if any.

Inter-Coding Mode

Referring generally to FIGS. 1-6, for coding blocks being coded in the inter-coding mode, motion estimator 416 may divide each coding block into one or more prediction blocks, e.g. having sizes such as 4×4 pixels, 8×8 pixels, 16×16 pixels, 32×32 pixels, or 64×64 pixels. For example, a 64×64 coding block may be divided into sixteen 16×16 prediction blocks, four 32×32 prediction blocks, or two 32×32 prediction blocks and eight 16×16 prediction blocks. Motion estimator 416 may then calculate a motion vector ($MV_{calc}$) for each prediction block by identifying an appropriate reference block and determining the relative spatial displacement from the prediction block to the reference block.

In accordance with an aspect of at least one embodiment, in order to increase coding efficiency, the calculated motion vector ($MV_{calc}$) may be coded by subtracting a motion vector predictor ($MV_{pred}$) from the calculated motion vector ($MV_{calc}$) to obtain a motion vector differential (ΔMV). For example, if the calculated motion vector ($MV_{calc}$) is (5, −1) (i.e. a reference block from a previously encoded frame located five columns right and one row up relative to the current prediction block in the current frame) and the motion vector predictor is (5, 0) (i.e. a reference block from a previously encoded frame located five columns right and in the same row relative to the current prediction block in the current frame), the motion vector differential (ΔMV) will be:

$$MV_{calc} - MV_{pred} = (5,-1) - (5,0) = (0,-1) = \Delta MV.$$

The closer the motion vector predictor (MVpred) is to the calculated motion vector (MVcalc), the smaller the value of the motion vector differential (ΔMV). Therefore, accurate motion vector prediction which is independent of the content of the current prediction block, making it repeatable on the decoder side, may lead to significantly less information being needed to encode motion vector differentials than the calculated motion vectors over the course of an entire video sequence.

In accordance with an aspect of at least one embodiment, motion estimator 416 may use multiple techniques to obtain a motion vector predictor ($MV_{pred}$). For example, the motion vector predictor may be obtained by calculating the median value of several previously encoded motion vectors for prediction blocks of the current frame. For example, the motion vector predictor may be the median value of multiple previously coded reference blocks in the spatial vicinity of the current prediction block, such as: the motion vector for the reference block ($RB_a$) in the same column and one row above the current block; the motion vector for the reference block ($RB_b$) one column right and one row above the current prediction block; and the motion vector for the reference block ($RB_c$) one column to the left and in the same row as the current block.

As noted above, and in accordance with an aspect of at least one embodiment, motion estimator 416 may use additional or alternative techniques to provide a motion vector predictor for a prediction block in inter-coding mode. For example, another technique for providing a motion vector predictor may be to determine the mean value of multiple previously coded reference blocks in the spatial vicinity of the current prediction block, such as: the motion vector for the reference block ($RB_a$) in the same column and one row above the current block; the motion vector for the reference block ($RB_b$) one column right and one row above the current prediction block; and the motion vector for the reference block ($RB_c$) one column to the left and in the same row as the current block.

In accordance with an aspect of at least one embodiment, in order to increase coding efficiency, the encoder 400 may indicate which of the available techniques was used in the encoding of the current prediction block by setting a selected-motion-vector-prediction-method (SMV-PM) flag in the picture header for the current frame (or the prediction block header of the current prediction block). For example, in at least one embodiment the SMV-PM flag may be a one bit variable having two possible values, wherein one possible value indicates the motion vector predictor was obtained using the median technique described above and the second possible value indicates the motion vector predictor was obtained using an alternative technique.

In coding blocks encoded in the inter-coding mode, both the motion vector and the residual may be encoded into the bit-stream.

Skip-Coding and Direct-Coding Modes

For coding blocks being coded in the skip-coding or direct-coding modes, motion estimator 416 may use the entire coding block as the corresponding prediction block (PB).

In accordance with an aspect of at least one embodiment, in the skip-coding and direct-coding modes, rather than determine a calculated motion vector ($MV_{calc}$) for a prediction block (PB), motion estimator 416 may use a predefined method, described below, to generate an ordered list of motion vector candidates. For example, for a current prediction block ($PB_{cur}$), the ordered list of motion vector candidates may be made up of motion vectors previously used for coding other blocks of the current frame, referred to as "reference blocks" (RBs).

In accordance with an aspect of at least one embodiment, motion estimator 416 may then select the best motion vector candidate (MVC) from the ordered list for encoding the current prediction block ($PB_{cur}$). If the process for generating the ordered list of motion vector candidates is repeatable on the decoder side only the index of the selected motion vector ($MV_{sel}$) within the ordered list of motion vector candidates may be included in encoded bit-stream rather than a motion vector itself. Over the course of an entire video sequence significantly less information may be needed to encode the index values than actual motion vectors.

In accordance with an aspect of at least one embodiment, the motion vectors selected to populate the motion vector candidate list are preferably taken from three reference blocks ($RB_a$, $RB_b$, $RB_c$) that have known motion vectors and share a border the current prediction block ($PB_{cur}$) and/or another reference block (RB). For example, the first reference block ($RB_a$) may be located directly above the current prediction block ($PB_{cur}$), the second reference block ($RB_b$) may be located directly to the right of the first reference block ($RB_a$), and the third reference block ($RB_c$) may be located to the left of the current prediction block (RBc). However, the specific locations of the reference blocks relative to the current prediction block may not be important, so long as they are pre-defined so a downstream decoder may know where they are.

In accordance with an aspect of at least one embodiment, if all three reference blocks have known motion vectors, the first motion vector candidate ($MVC_1$) in the motion vector candidate list for the current prediction block ($PB_{cur}$) may be the motion vector ($MV_a$) (or motion vectors, in a B-type frame) from the first reference block ($RB_a$), the second motion vector candidate ($MVC_2$) may be the motion vector ($MV_b$) (or motion vectors) from the second reference block ($RB_b$), and the third motion vector candidate ($MVC_3$) may be the motion vector ($MV_c$) (or motion vectors) from the third reference block ($RB_c$). The motion vector candidate list may therefore be: (MVa, MVb, MVc).

However, if any of the reference blocks (RBs) do not have available motion vectors, e.g. because no prediction information is available for a given reference block or the current prediction block ($PB_{cur}$) is in the top row, leftmost column, or rightmost column of the current frame, that motion vector candidate may be skipped and the next motion vector candidate may take its place, and zero value motion vectors (0,0) may be substituted for the remaining candidate levels. For example, if no motion vector is available for $RB_b$, the motion vector candidate list may be: (MVa, MVc, (0,0)).

The full set of combinations for a motion vector candidate list given various combinations of motion vector candidate availability, in accordance with at least one embodiment, is shown in Table 2:

TABLE 2

| $RB_a$ | $RB_b$ | $RB_c$ | $MVC_1$ | $MVC_2$ | $MVC_3$ |
|---|---|---|---|---|---|
| n/a | n/a | n/a | (0, 0) | (0, 0) | (0, 0) |
| n/a | n/a | $MV_c$ | $MV_c$ | (0, 0) | (0, 0) |
| n/a | $MV_b$ | N/A | $MV_b$ | (0, 0) | (0, 0) |
| n/a | $MV_b$ | $MV_c$ | $MV_b$ | $MV_c$ | (0, 0) |
| $MV_a$ | n/a | n/a | $MV_a$ | (0, 0) | (0, 0) |
| $MV_a$ | n/a | $MV_c$ | $MV_a$ | $MV_c$ | (0, 0) |
| $MV_a$ | $MV_b$ | n/a | $MV_a$ | $MV_b$ | (0, 0) |
| $MV_a$ | $MV_b$ | $MV_c$ | $MV_a$ | $MV_b$ | $MV_c$ |

Motion estimator 416 may then evaluate the motion vector candidates and select the best motion vector candidate to be used as the selected motion vector for the current prediction block. Note that as long as a downstream decoder knows how to populate the ordered list of motion vector candidates for a given prediction block, this calculation can be repeated on the decoder side with no knowledge of the contents of the current prediction block. Therefore, only the index of the selected motion vector from the motion vector candidate list needs to be included in encoded bit-stream rather than a motion vector itself, for example by setting a motion-vector-selection flag in the prediction block header of the current prediction block, and thus, over the course of an entire video sequence, significantly less information will be needed to encode the index values than actual motion vectors.

In the direct-coding mode, the motion-vector-selection flag and the residual between the current prediction block and the block of the reference frame indicated by the motion vector are encoded. In the skip-coding mode, the motion-vector-selection flag is encoded but the encoding of the residual signal is skipped. In essence, this tells a downstream decoder to use the block of the reference frame indicated by the motion vector in place of the current prediction block of the current frame.

Condensed Coding Block Header Techniques

Figure 8:
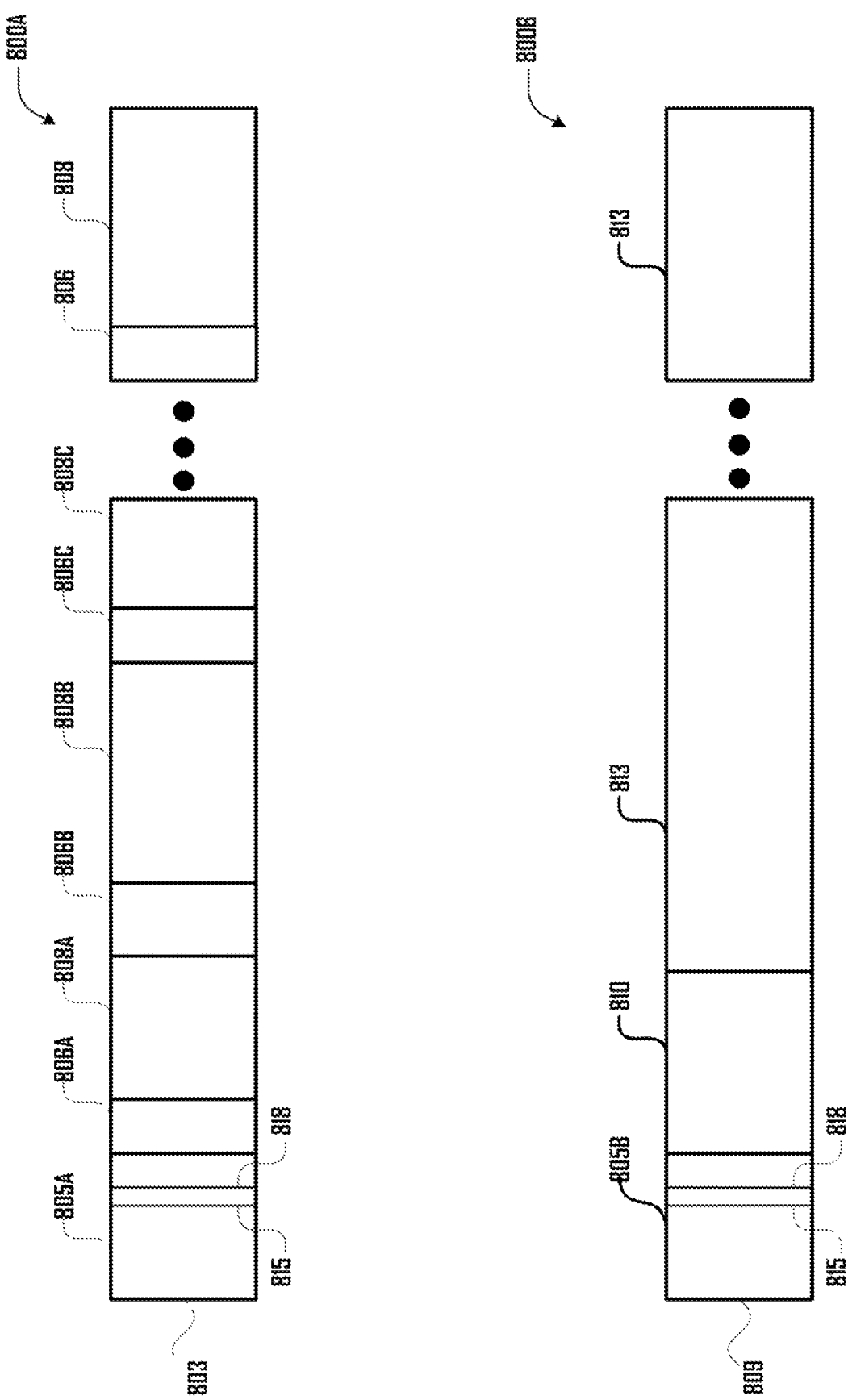
FIG. 8 illustrates an exemplary diagram of a non-condensed coding block header bit-stream format and a condensed coding block header bit-stream format in accordance with at least one embodiment.

Referring to FIG. 8, in accordance with at least one embodiment, an encoder, such as encoder 400, may select between at least two output bit-stream formats: a non-condensed header format 800A and a condensed header format 800B.

In non-condensed header format 800A, a bit-stream 803 corresponding to a complete frame may include a picture header 805A, followed by a first coding block header 806A for the first coding block of the frame, followed by a first residual data block 808A corresponding to the image data for the first coding block of the frame, followed by a second coding block header 806B for the second coding block, followed by a second residual data block 808B corresponding to the image data for the second coding block, followed by a third coding block header 806C for the third coding block, followed by a third residual data block 808C corresponding to the image data for the third coding block, etc.

Picture header 805A may contain information relevant to a downstream decoder, such as decoder 500, for decoding the complete frame, such as an LCB-size code word (or flag) (not shown), indicating the LCB size for the current frame, a prediction direction code word, indicating the temporal direction the prediction signal originates from with respect to the current frame. For example, an LCB size code word may have two possible values, a first value indicating an LCB size of 64×64 bits and a second value indicating an LCB size of 128×128 bits, and the prediction direction code word may have three possible values with the first value indicating a bi-directional prediction signal, the second value indicating prediction signal from a temporally previous picture, and the third value indication a prediction signal for a temporally future picture.

Similarly, each coding block header 806 may contain the information relevant to a downstream decoder, such as decoder 500, for decoding the upcoming coding block 808. For example, a coding block header may include code words relating to the coding block's split flag, encoding mode/coding block type, prediction information, motion information, and the like.

In condensed header format 800B, a bit-stream 809 corresponding to a complete frame may include a picture header 805B, as in non-condensed header format 800A, followed by a condensed coding block header 810, including all the header information for all the coding blocks of the frame, followed by a condensed residual data block 813, including all the image data for the frame.

A condensed-header code word 815 in picture header 805B may be used to signal to a decoder which bit-stream format to expect, condensed or non-condensed. For example, condensed-header code word 815 may have two possible values, a first value indicating the upcoming bit-stream is encoded using condensed header format 800B and a second value indicating the upcoming bit-stream is encoded using non-condensed header format 800A. The adjacency of a frame's coding block header data in condensed header format 800B allows various compression techniques to be applied to the block header data that could not be applied in non-condensed header format 800A, thereby improving the efficiency of the overall encoding process.

Channel coding usually adds some protection bits to the bit-stream. Generally, the protection bits will be allocated equally on the picture header and other bits in the bit-stream. However, when using condense header information, more protection bits will be allocated on the picture header and condense header, and less protection bits will be allocated on other bits in the bit-stream.

Figure 9A:
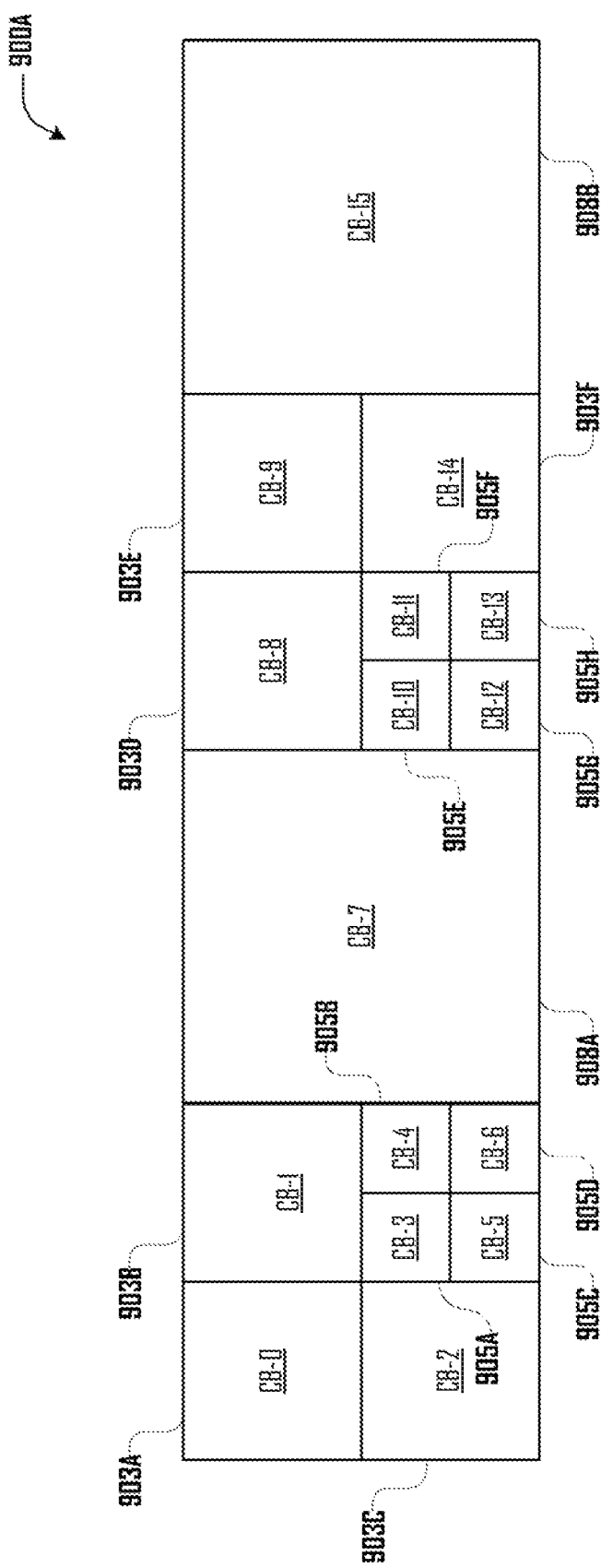
FIGS. 9A-C illustrate a schematic diagram of an exemplary application of the non-condensed coding block header bit-stream format and the condensed coding block header bit-stream format illustrated in FIG. 8 in accordance with at least one embodiment.

FIG. 9A illustrates a conceptual diagram of a partial video frame 900A including four LCB-sized portions of the video frame divided into a plurality of coding blocks $CB_0$-$CB_{15}$ according to the recursive coding block splitting schema describe above. Assuming an LCB size of 64×64 for the present example, the four LCB-sized portions of partial video frame 900A have been divided into six 32×32 coding blocks ($CB_0$-$CB_2$, $CB_8$-$CB_9$, and $CB_{14}$) 903A-F, eight 16×16 coding blocks ($CB_3$-$CB_6$ and $CB_{10}$-$CB_{13}$) 905A-H, and two 64×64 (LCB-sized) coding blocks ($CB_7$ and $CB_{15}$) 908A-B, as is shown in Table 3.

Figure 9B:
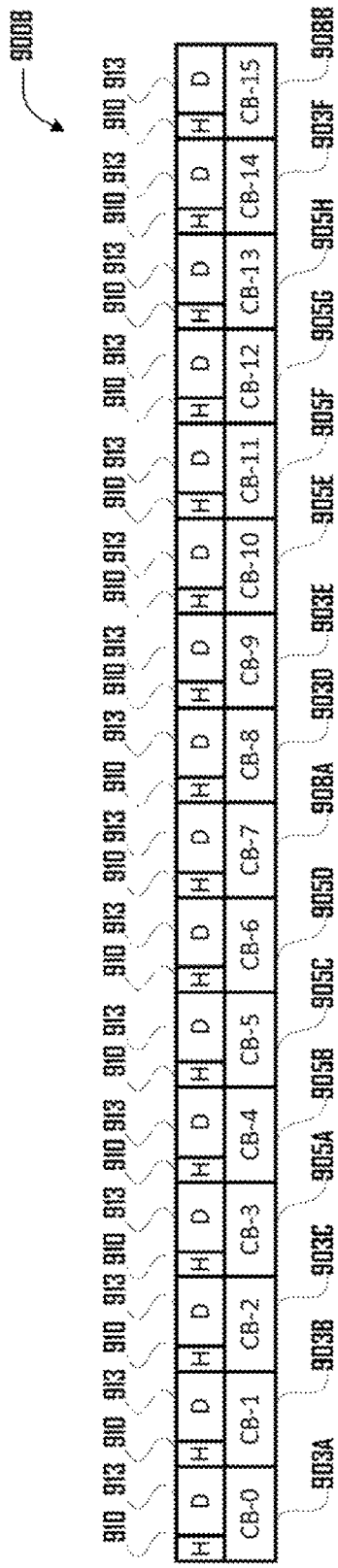

FIG. 9B illustrates a conceptual diagram of an encoding-order based sequence 900B of encoded versions of partial video frame 900A, which may be suitable for use with the non-condensed header format described above in reference to FIG. 8. Each encoded coding block $CB_0$-$CB_{15}$ of partial video frame 900A has a corresponding coding block header portion (H) 910 and data portion (D) 913 in encoding-order based sequence 900B. Note that the uniform width of each encoded coding block header portion 910 and data portion 913 in example shown in FIG. 9B is for simplified illustrative purposes only.

TABLE 3

| Coding Block | Size | Order bit-stream format | Encoding-size bit-stream format | Reference Number |
|---|---|---|---|---|
| $CB_0$ | 32 × 32 | 1 | 3 | 903A |
| $CB_1$ | 32 × 32 | 2 | 4 | 903B |
| $CB_2$ | 32 × 32 | 3 | 5 | 903C |
| $CB_3$ | 16 × 16 | 4 | 9 | 905A |
| $CB_4$ | 16 × 16 | 5 | 10 | 905B |
| $CB_5$ | 16 × 16 | 6 | 11 | 905C |
| $CB_6$ | 16 × 16 | 7 | 12 | 905D |
| $CB_7$ | 64 × 64 | 8 | 1 | 908A |
| $CB_8$ | 32 × 32 | 9 | 6 | 903D |
| $CB_9$ | 32 × 32 | 10 | 7 | 903E |
| $CB_{10}$ | 16 × 16 | 11 | 13 | 905E |
| $CB_{11}$ | 16 × 16 | 12 | 14 | 905F |
| $CB_{12}$ | 16 × 16 | 13 | 15 | 905G |
| $CB_{13}$ | 16 × 16 | 14 | 16 | 905H |
| $CB_{14}$ | 32 × 32 | 15 | 8 | 903F |
| $CB_{15}$ | 64 × 64 | 16 | 2 | 908B |

Figure 9C:
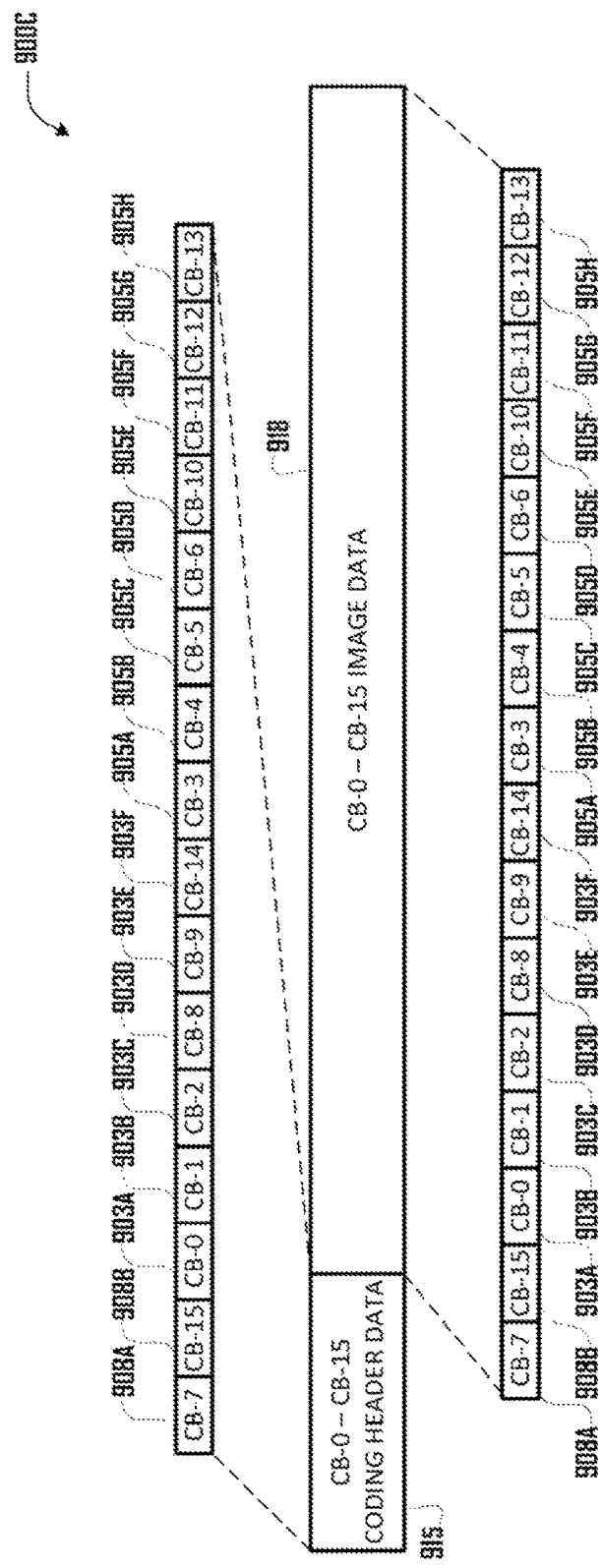

FIG. 9C illustrates a conceptual diagram of a coding-block size order based sequence 900C of encoded versions of partial video frame 900A, which may be suitable for use with the condensed header format described above in reference to FIG. 8. The header information for each coding block $CB_0$-$CB_{15}$ is placed in a condensed header portion (CH) 915, including the coding block header information for each coding block $CB_0$-$CB_{15}$, and a combined data portion (CD) 918, including the image data for each coding block $CB_0$-$CB_{15}$, in coding block size order based sequence 900C.

Various techniques may be used to improve coding efficiency when using the condensed header format. Different techniques may be applied to different elements of the coding block header data and corresponding coding block header code words/flags may be used to indicate which technique is used to a downstream decoder. For example, various known lossless coding techniques may be used to encode various portions of the coding block header data, such as a run-length coding algorithm, the LZ77 algorithm, the LZ78 algorithm, the Lempel-Ziv-Markov chain algorithm, or the like.

In various embodiments for example, fixed-length coding or variable-length coding techniques may be used to encode the coding block type information for individual coding blocks (e.g., was the coding block encoded using intra-prediction, inter-prediction, the skip coding mode, or the direct coding mode), as is shown in Table 4, and run-length coding techniques may then be used to encode the coding block type information for sequences of coding blocks. For each coding block type in such a sequence of coding blocks, the condensed coding block header may contain a sequence of ordered pairs, the first tuple of each ordered pair being a coding block type code word (corresponding to intra, inter, skip, or direct), which may, for example be coded using a fixed or variable length coding, and the second tuple of each ordered pair being the number of consecutive coding blocks of that coding block type, which may, for example, be coded using exponential-golomb coding techniques or the like.

TABLE 4

| Coding Block Type | Fixed Length Code-word | Variable Length Code-word |
|---|---|---|
| Intra-mode | 00 | 0 |
| Inter-mode | 01 | 10 |
| Skip-mode | 10 | 110 |
| Direct-mode | 11 | 111 |

In some embodiments, run-length coding may be used to encode data corresponding to the encoding mode/coding block type of sequences of coding blocks in the condensed coding block header.

For example, a sequence of ten coding blocks in a bit-stream may have the associated coding block types shown in Table 5. The coding block type data for coding blocks $CB_i$-$CB_{i+9}$ in the condensed coding block header may be represented by the bit sequences shown in Table 6.

TABLE 5

| Coding Block | Coding Block Type |
|---|---|
| $CB_i$ | Intra |
| $CB_{i+1}$ | Intra |
| $CB_{i+2}$ | Inter |
| $CB_{i+3}$ | Inter |
| $CB_{i+4}$ | Inter |
| CB i + 5 | Inter |
| CB i + 6 | Skip |
| CB i + 7 | Skip |
| CB i + 8 | Direct |
| CB i + 9 | Direct |

TABLE 6

| CBi-CBi + 1 | | CBi + 2-CBi + 5 | | CBi + 6-CBi + 7 | | CBi + 8-CBi + 9 | | |
|---|---|---|---|---|---|---|---|---|
| 1st tuple | 2st tuple | 1st tuple | 2st tuple | 1st tuple | 2st tuple | 1st tuple | 2st tuple | |
| 00 | 011 | 01 | 00101 | 10 | 011 | 10 | 011 | Fixed Length |
| 0 | 011 | 10 | 00101 | 110 | 011 | 110 | 011 | Var Length |

Video Encoding Routine

Figure 10A:
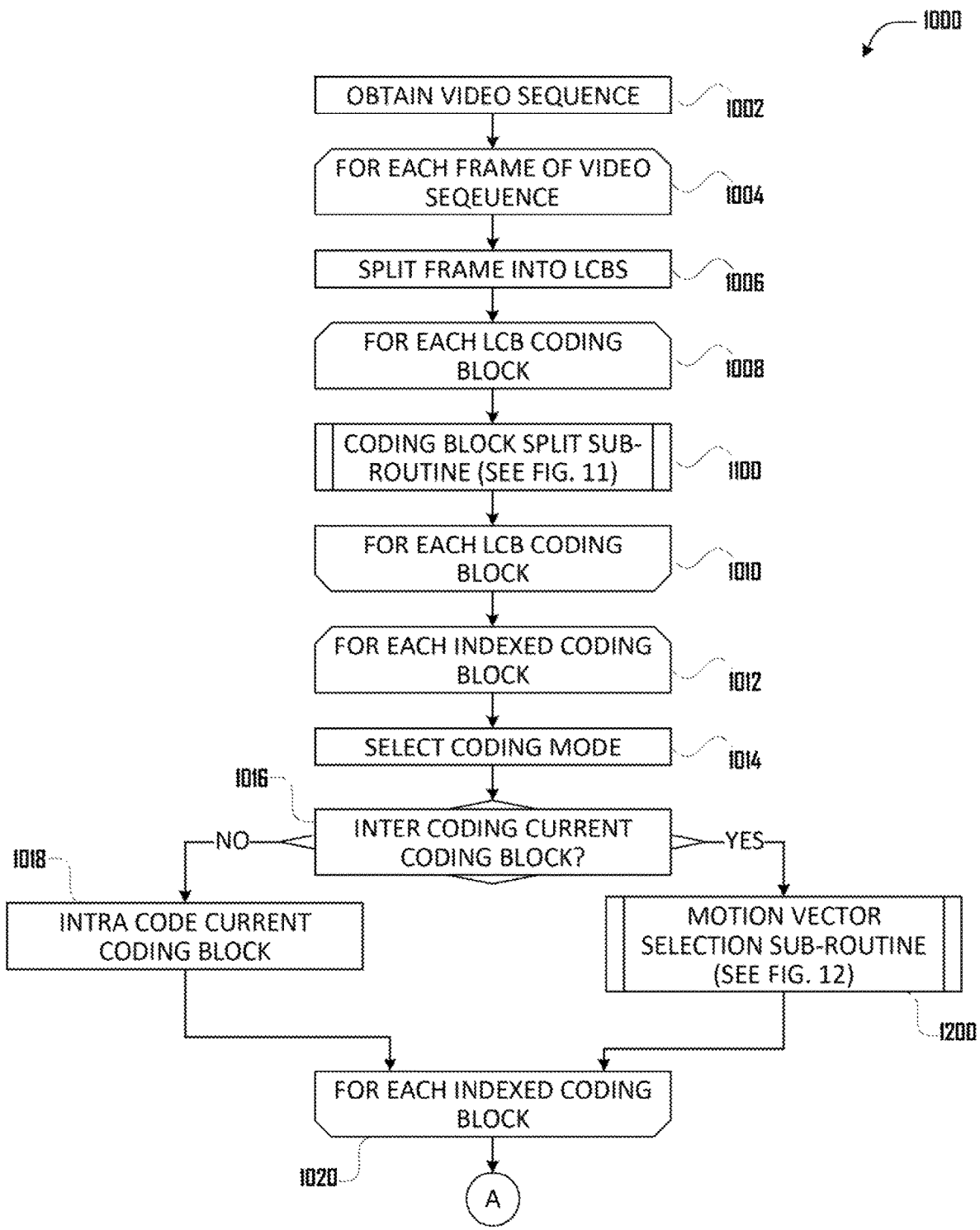
FIGS. 10A-B illustrate an exemplary video encoding routine in accordance with at least one embodiment.
Figure 10B:
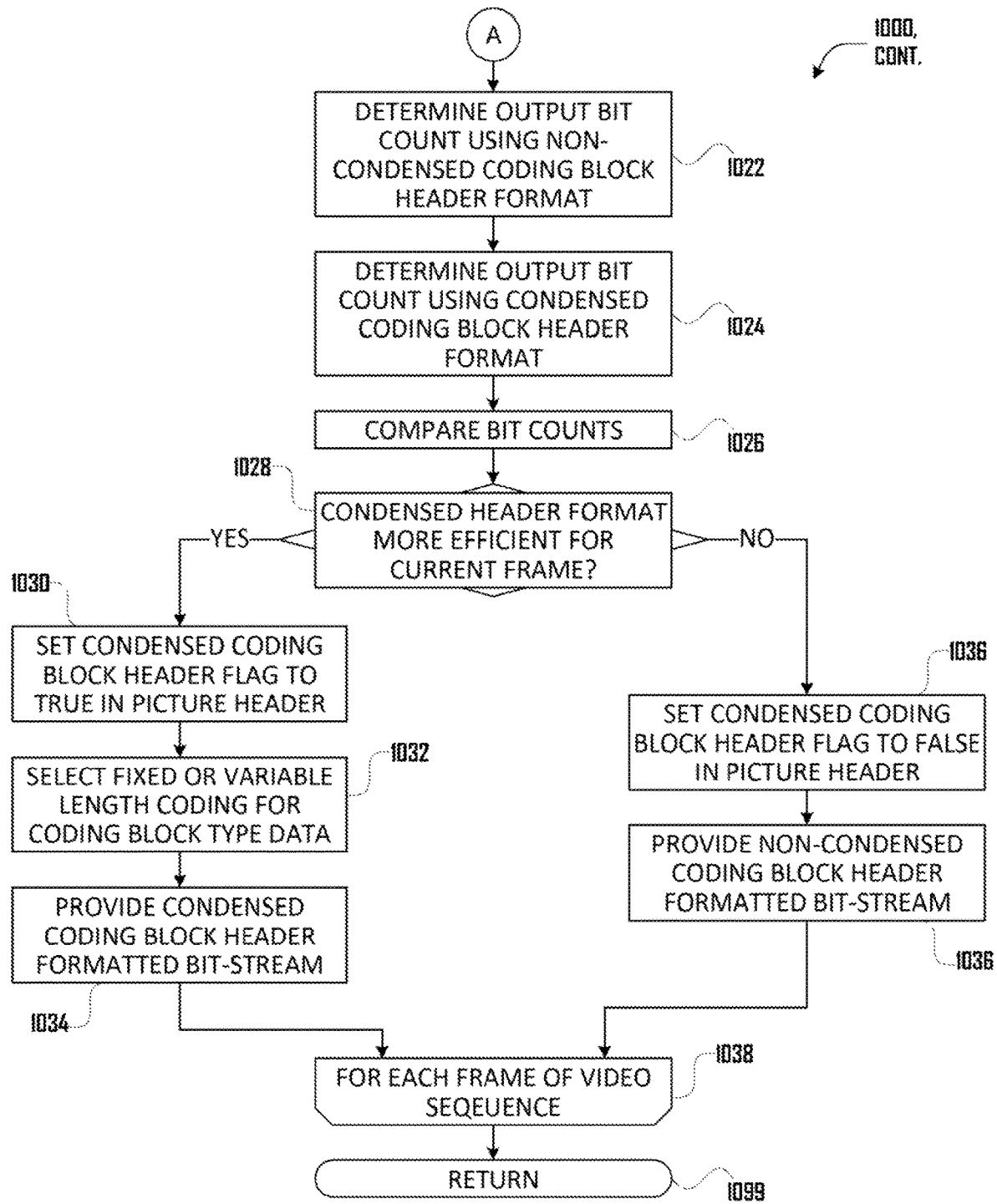

FIGS. 10A-B illustrate an exemplary video encoding routine 1000, such as may be performed by encoder 400 in accordance with various embodiments. Video encoding routine 1000 intentionally simplifies the encoding process in order to focus the description on the recursive coding block splitting techniques and condensed coding block header formatting described above.

Referring to FIG. 10A, video encoding routine 1000 may obtain a video sequence at execution block 1002. The video sequence may include data corresponding to a plurality of un-encoded video frames.

At starting loop 1004, video encoding routine 1000 may process each frame of the video sequence in turn.

Video encoding routine 1000 may split the frame into LCB-sized coding block candidates ("LCBCs") at execution block 1006.

At starting loop block 1008, video encoding routine 1000 may process each LCBC in turn, e.g. starting with the LCBC in the upper left corner of the frame and proceeding left-to-right, top-to-bottom.

At sub-routine block 1100, video encoding routine 1000 may call coding block splitting sub-routine 1100, described below in reference to FIG. 11. As is described below, sub-routine 1100 applies the recursive coding block splitting technique described below to a given LCBC, resulting in the LCBC being indexed into one or more coding blocks.

At ending loop block 1010, video encoding routine 1000 loops back to starting loop block 1008 to process the next LCBC of the current frame, if any.

At starting loop block 1012, video encoding routine 1000 may process each indexed coding block of the current frame of the video sequence in turn.

Video encoding routine 1000 may select a coding mode (intra/inter) for the current coding block at execution block 1014.

At decision block 1016, if the selected coding mode for the current coding block is inter-coding, then video encoding routine 1000 may proceed to sub-routine block 1200; otherwise video encoding routine 1000 may proceed to execution block 1018.

At sub-routine block 1200, video encoding routine 1000 may call motion-vector-selection sub-routine 1200, described below in reference to FIG. 12.

Video encoding routine 1000 may intra-code the current coding block at execution block 1018.

Routine 1100 may encode the current coding block at execution block 1014.

At ending loop block 1020, video encoding routine 1000 may loop back to starting loop block 1012 and process the next indexed coding block of the current frame, if any.

Referring now to FIG. 10B, video encoding routine 1000 may determine an output bit count for encoding the current frame of the video sequence using the non-condensed coding block header format described above at execution block 1022.

Video encoding routine 1000 may determine an output bit count for encoding the current frame of the video sequence using the condensed coding block header format described above at execution block 1024.

Video encoding routine 1000 may compare the bit counts from using the non-condensed and condensed header formats at execution block 1026.

At decision block 1028, if using the condensed header format is more efficient than using the non-condensed header format for encoding the current frame, then video encoding routine 1000 may proceed to execution block 1030; otherwise, video encoding routine 1000 may proceed to execution block 1036.

Video encoding routine 1000 may set the value of a condensed coding block header flag to 'true' in the picture header for the current frame at execution block 1030.

Video encoding routine 1000 may select fixed length or variable length coding for the coding block type data corresponding to the coding blocks of the current frame at execution block 1032.

Video encoding routine 1000 may provide a condensed coding block header formatted bit-stream corresponding to the current frame at execution block 1034.

Video encoding routine 1000 may set the value of a condensed coding block header flag to 'false' in the picture header for the current frame at execution block 1036.

Video encoding routine 1000 may provide a non-condensed coding block header formatted bit-stream corresponding to the current frame at execution block 1038.

At ending loop block 1038, video encoding routine 1000 may loop back to starting loop block 1004 to process the next frame of the video sequence, if any.

Coding block indexing video encoding routine 1000 ends at return block 1099.

Coding Block Splitting Sub-Routine

Figure 11:
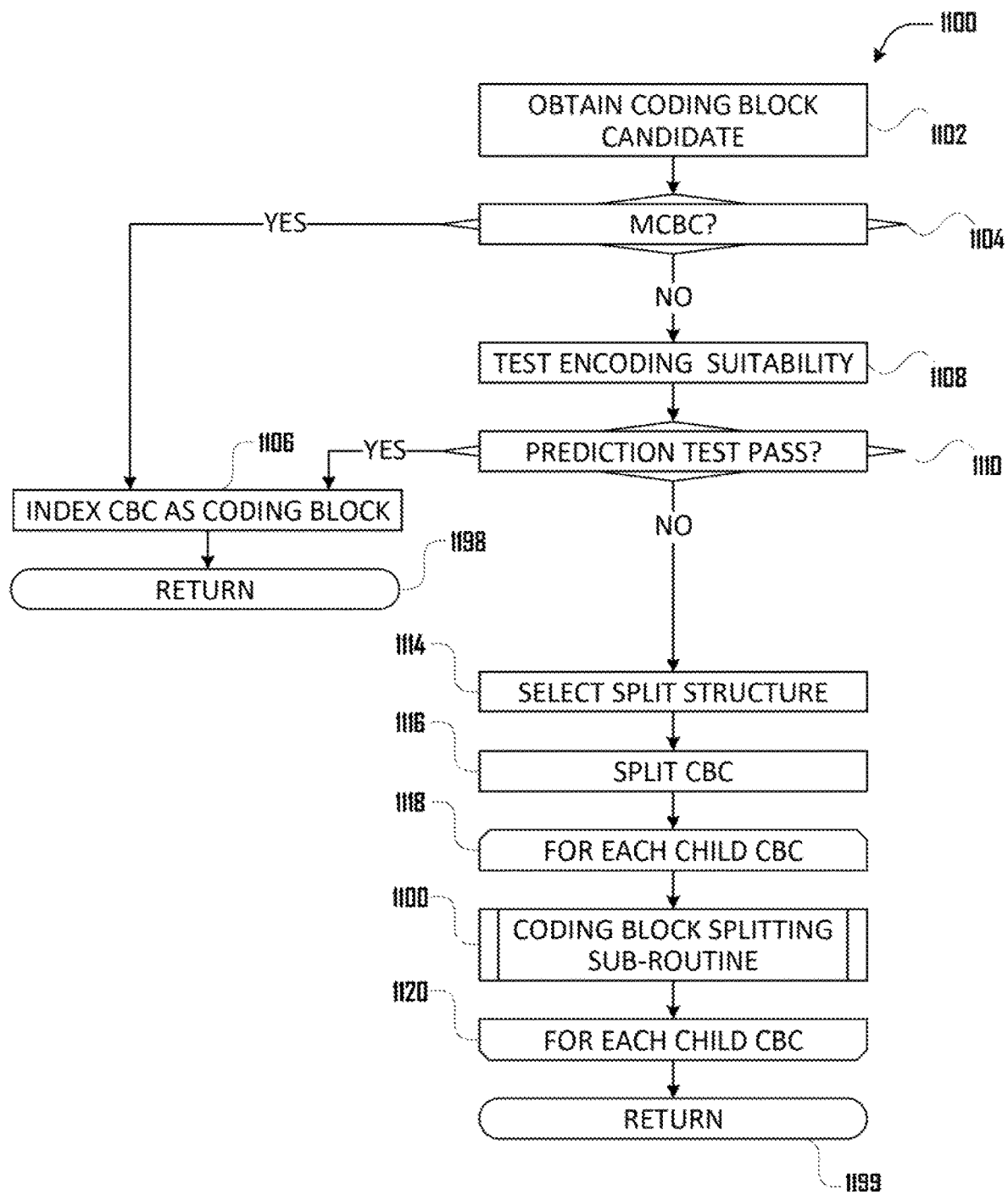
FIG. 11 illustrates an exemplary coding block splitting sub-routine in accordance with at least one embodiment.

FIG. 11 illustrates an exemplary coding block splitting sub-routine 1100, such as may be performed by an encoder, such as encoder 400, e.g. in response to a call from video encoding routine 1000 or in response to a recursive call from another instance of coding block splitting routine 1100, in accordance with various embodiments.

Coding block splitting sub-routine 1100 obtains a CBC at execution block 1102. The coding block candidate may be provided from routine 1100 or recursively, as is described below.

At decision block 1104, if the obtained CBC is an MCBC, then coding block splitting sub-routine 1100 may proceed to execution block 1106; otherwise coding block splitting sub-routine 1100 may proceed to execution block 1108.

Coding block splitting sub-routine 1100 may index the obtained CBC as a coding block at execution block 1106. Coding block splitting sub-routine 1100 may then terminate at return block 1198.

Coding block splitting sub-routine 1100 may test the encoding suitability of the current CBC at execution block 1108. For example, coding block splitting sub-routine 1100 may analyze the pixel values of the current CBC and determine whether the current CBC only contains pixels of a single value, or whether the current CBC matches a predefined pattern.

At decision block 1110, if the current CBC is suitable for encoding, coding block splitting sub-routine 1100 may proceed to execution block 1106; otherwise coding block splitting sub-routine 1100 may proceed to execution block 1114.

Coding block splitting sub-routine 1100 may select a coding block splitting structure for the current square CBC at execution block 1114. For example, coding block splitting sub-routine 1100 may select between first rectangular coding block structure 608, second rectangular coding structure 614, or four square coding block structure 620 of recursive coding block splitting schema 600, described above with reference to FIG. 6.

Coding block splitting sub-routine 1100 may split the current CBC into two or four child CBCs in accordance with recursive coding block splitting schema 1100 at execution block 1116.

At starting loop block 1118, coding block splitting sub-routine 1100 may process each child CBC resulting from the splitting procedure of execution block 1116 in turn.

At sub-routine block 1100, coding block splitting sub-routine 1100 may recursively call itself to process the current child CBC in the manner presently being described.

At ending loop block 1120, coding block splitting sub-routine 1100 loops back to starting loop block 1118 to process the next child CBC of the current CBC, if any.

Coding block splitting sub-routine 1100 may then terminate at return block 1199.

Motion Vector Selection Routine

Figure 12:
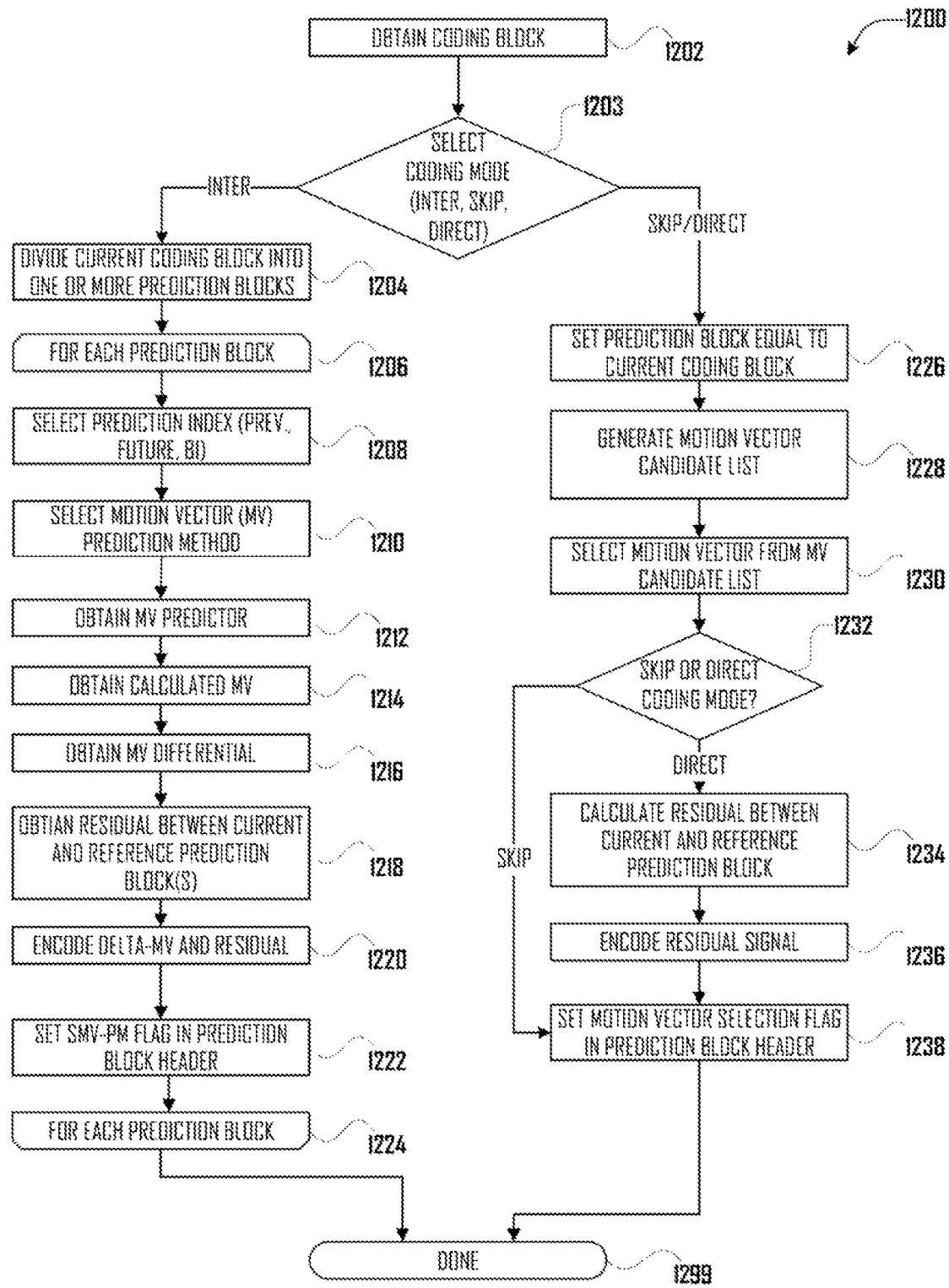
FIG. 12 illustrates an exemplary motion-vector-selection routine in accordance with at least one embodiment.

FIG. 12 illustrates a motion-vector-selection sub-routine 1200 suitable for use with a video encoder, such as encoder 400. As will be recognized by those having ordinary skill in the art, not all events in the encoding process are illustrated in FIG. 12. Rather, for clarity, only those steps reasonably relevant to describing the motion-vector-selection routine are shown.

At execution block 1202, a coding block is obtained, e.g. by motion estimator 416.

At decision block 1203, motion-vector-selection sub-routine 1200 selects a coding mode for the coding block. For example, as is described above, an inter-coding mode, a direct-coding mode, or a skip-coding mode may be selected. If either the skip-coding or the direct-coding modes are selected for the current coding block, motion-vector-selection sub-routine 1200 may proceed to execution block 1226, described below; otherwise motion-vector-selection sub-routine 1200 may proceed to execution block 1204.

Motion-vector-selection sub-routine 1200 may divide the current coding block into one or more prediction blocks at execution block 1204.

At starting loop block 1206, motion-vector-selection sub-routine 1200 may process each prediction block of the current coding block in turn.

Motion-vector-selection sub-routine 1200 may select a prediction index for the current prediction block, indicating whether the reference frame is a previous picture, a future picture, or both, in the case of a B-type picture, at execution block 1208.

Motion-vector-selection sub-routine 1200 may select a motion-vector prediction method, such as the median or mean techniques described above or any available alternative motion-vector prediction method, at execution block 1210.

Motion-vector-selection sub-routine 1200 may obtain a motion vector predictor ($MV_{pred}$) for the current prediction block using the selected motion vector prediction method at execution block 1212.

Motion-vector-selection sub-routine 1200 may obtain a calculated motion vector ($MV_{calc}$) for the current prediction block at execution block 1214.

Motion-vector-selection sub-routine 1200 may obtain a motion vector differential (ΔMV) for the current prediction block (note for P-type pictures there may be a single motion vector differential and for B-type pictures there may be two motion vector differentials) at execution block 1216.

Motion-vector-selection sub-routine 1200 may obtain a residual between the current prediction block ($PB_{cur}$) relative to the block indicated by the calculated motion vector ($MV_{calc}$) at execution block 1218.

Motion-vector-selection sub-routine 1200 may encode the motion vector differential(s) and the residual for the current prediction block at execution block 1220.

Motion-vector-selection sub-routine 1200 may set an SMV-PM flag in the picture header for the current frame (or the prediction block header for the current prediction block) indicating which motion vector prediction technique was used for the current prediction block at execution block 1222.

At ending loop block 1224, motion-vector-selection sub-routine 1200 returns to starting loop block 1206 to process the next prediction block (if any) of the current coding block.

Returning to decision block 1203, if either the skip-coding or direct-coding modes is selected for the current coding block, motion-vector-selection sub-routine 1200 may proceed to execution block 1226.

Motion-vector-selection sub-routine 1200 sets the current prediction block to equal the current coding block at execution block 1226.

Motion-vector-selection sub-routine 1200 may then generate a list of motion vector candidates ate execution block 1228.

Motion-vector-selection sub-routine 1200 may then select a motion vector from the motion vector candidate list for use in coding the current prediction block at execution block 1230.

At decision block 1232, if the selected coding mode is direct-coding, then motion-vector-selection sub-routine 1200 may proceed to execution block 1234; otherwise motion-vector-selection sub-routine 1200 may proceed to execution block 1238.

Motion-vector-selection sub-routine 1200 may calculate a residual between the current prediction block and the reference block indicated by the selected motion vector at execution block 1234.

Motion-vector-selection sub-routine 1200 may encode the residual at execution block 1236.

Motion-vector-selection sub-routine 1200 may set a motion-vector-selection flag in the current prediction block's prediction block header indicating which of the motion vector candidates was selected for use in coding the current prediction block at execution block 1238.

Motion-vector-selection sub-routine 1200 ends at termination block 1299.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A method of encoding an unencoded video frame of a sequence of video frames to generate an encoded bit-stream representative of the unencoded video frame, the unencoded video frame including an array of pixels and the encoded bit-stream representative of the unencoded video frame including at least a header and a video data payload, the method comprising:

obtaining the array of pixels;

dividing the array of pixels along a plurality of horizontal and vertical axes, thereby defining a plurality of coding blocks;

determining a coding block type for each coding block of the plurality of coding blocks;

selecting an encoding technique for encoding data corresponding to the coding block type for each coding block of the plurality of coding blocks;

generating encoded video data and coding-block header data for each coding block of the plurality of coding blocks;

determining the encoded bit-stream representative of the unencoded video frame is to be generated with a condensed coding-block header format;

generating the video data payload of the encoded bit-stream representative of the unencoded video frame using the video data for each coding block of the plurality of coding blocks and using the selected encoding technique for the corresponding coding-block type for each coding block;

generating a condensed coding-block header portion of the header of the encoded bit-stream representative of the unencoded video frame using the coding-block header data for each coding block of the plurality of coding blocks, wherein the condensed coding-block header portion includes a condensed header flag having a value for signaling to a decoding device that the encoded bit-stream representative of the unencoded video frame has been generated with a condensed coding-block header format, and wherein the condensed coding-block header portion includes a coding-block-type flag having a value for signaling to a decoding device that the encoded bit-stream representative of the unencoded video frame has been generated with the selected encoding technique.

2. The method of claim 1, wherein selecting the encoding technique for encoding data corresponding to the coding-block type for each coding block of the plurality of coding blocks comprises:
  determining a first value corresponding to a length, in bits, of the encoded bit-stream representative of the unencoded video frame generated using a fixed length encoding technique to encode data corresponding to the coding-block type for each coding block of the plurality of coding blocks,
  determining a second value, the second value corresponding to a length, in bits, of the encoded bit-stream representative of the unencoded video frame generated using a variable length encoding technique to encode data corresponding to the coding-block type for each coding block of the plurality of coding blocks, and
  comparing the first and second values to select the encoding technique.

3. The method of claim 1, wherein determining the encoded bit-stream representative of the unencoded video frame is to be generated with the condensed coding-block header format comprises:
  determining a first value, the first value corresponding to a length, in bits, of the encoded bit-stream representative of the unencoded video frame generated using the condensed coding-block header format to encode data corresponding to the coding-block type for each coding block of the plurality of coding blocks,
  a second value, the second value corresponding to a length, in bits, of the encoded bit-stream representative of the unencoded video frame generated using a non-condensed coding header format to encode data corresponding to the coding-block type for each coding block of the plurality of coding blocks, and
  determining the first value is less than the second value.

4. The method of claim 1, wherein dividing the array of pixels along the plurality of horizontal and vertical axes, thereby defining the plurality of coding blocks comprises:
  determining a maximum coding-block size for the encoded bit-stream representative of the unencoded video frame, the maximum coding-block size including a horizontal dimension, measured in pixels, and a vertical dimension, measured in pixels;
  dividing the array of pixels along a plurality of horizontal and vertical axes, thereby defining a plurality of maximum sized coding blocks, each of the plurality of maximum sized coding blocks being of the maximum coding-block size; and
  for a coding block of the plurality of maximum sized coding blocks, recursively:
    (a) determining whether the coding block is to be encoded or further divided;
    (b) in response to determining the coding block is to be encoded:
      (b.1) creating an encoded version of the coding block;
      (b.2) providing an indication in the header of the encoded bit-stream representative of the unencoded video frame that the encoded version of the coding block was created; and
      (b.3) providing the encoded version of the coding block in the video data payload of the encoded bit-stream representative of the unencoded video frame;
    (c) in response to determining the coding block is to be further divided:
      (c.1) dividing the coding block along at least one of a horizontal transverse axis and a vertical transverse axis, thereby creating a plurality of new coding blocks;
      (c.2) providing an indication in the header of the encoded bit-stream representative of the unencoded video frame that the coding block was further divided; and
      (c.3) setting the plurality of new coding blocks as the coding block for recursive processing; and
  wherein the frame header data portion of the header of the encoded bit-stream representative of the unencoded video frame includes a maximum coding-block-size flag having a value for signaling to a decoding device that the encoded bit-stream representative of the unencoded video frame has been generated using the maximum coding-block size.

5. The method of claim 4, wherein horizontal dimension of the maximum coding-block size is sixty four pixels and the vertical dimension of the maximum coding-block size is sixty four pixels.

6. The method of claim 4, wherein horizontal dimension of the maximum coding-block size is one hundred and twenty eight pixels and the vertical dimension of the maximum coding-block size is one hundred and twenty eight pixels.

7. An encoding device, comprising:
  a non-transitory memory that stores computer instructions; and
  at least one processor that executes the computer instructions to:
    obtain an array of pixels of an unencoded video frame;
    divide the array of pixels along a plurality of horizontal and vertical axes, thereby defining a plurality of coding blocks;
    determine a coding block type for each coding block of the plurality of coding blocks;
    select an encoding technique for encoding data corresponding to the coding block type for each coding block of the plurality of coding blocks;
    generate encoded video data and coding-block header data for each coding block of the plurality of coding blocks;
    determine an encoded bit-stream representative of the unencoded video frame is to be generated with a condensed coding-block header format;
    generate a video data payload of an encoded bit-stream representative of the unencoded video frame using the video data for each coding block of the plurality of coding blocks and using the selected encoding technique for the corresponding coding-block type for each coding block;
    generate a condensed coding-block header portion of a header of the encoded bit-stream representative of the unencoded video frame using the coding-block header data for each coding block of the plurality of coding blocks; and
    generate a frame header data portion of the header of the encoded bit-stream representative of the unencoded video frame that includes a condensed header flag having a value for signaling to a decoding device that the encoded bit-stream representative of the unencoded video frame has been generated with a condensed coding-block header format and that includes a coding-block-type flag having a value for signaling to a decoding device that the encoded bit-stream representative of the unencoded video frame has been generated with the selected encoding technique.

8. The encoding device of claim 7, wherein the at least one processor selects the encoding technique for encoding data corresponding to the coding-block type for each coding block of the plurality of coding blocks by executing further instructions to:

determine a first value, the first value corresponding to a length, in bits, of the encoded bit-stream representative of the unencoded video frame generated using a fixed length encoding technique to encode data corresponding to the coding-block type for each coding block of the plurality of coding blocks, determine a second value, the second value corresponding to a length, in bits, of the encoded bit-stream representative of the unencoded video frame generated using a variable length encoding technique to encode data corresponding to the coding-block type for each coding block of the plurality of coding blocks, and compare the first and second values to select the encoding technique.

9. The encoding device of claim 7, wherein the at least one processor determines the encoded bit-stream representative of the unencoded video frame is to be generated with the condensed coding-block header format by executing further computer instructions to:

determine a first value, the first value corresponding to a length, in bits, of the encoded bit-stream representative of the unencoded video frame generated using the condensed coding-block header format to encode data corresponding to the coding-block type for each coding block of the plurality of coding blocks, determine a second value, the second value corresponding to a length, in bits, of the encoded bit-stream representative of the unencoded video frame generated using a non-condensed coding header format to encode data corresponding to the coding-block type for each coding block of the plurality of coding blocks, and determine the first value is less than the second value.

10. The encoding device of claim 7, wherein the at least one processor divides the array of pixels along the plurality of horizontal and vertical axes, thereby defining the plurality of coding blocks by executing further computer instructions to:

determine a maximum coding-block size for the encoded bit-stream representative of the unencoded video frame, the maximum coding-block size including a horizontal dimension, measured in pixels, and a vertical dimension, measured in pixels;

divide the array of pixels along a plurality of horizontal and vertical axes, thereby defining a plurality of maximum sized coding blocks, each of the plurality of maximum sized coding blocks being of the maximum coding-block size; and for a coding block of the plurality of maximum sized coding blocks, recursively:

determine whether the coding block is to be encoded or further divided;

in response to determining the coding block is to be encoded:

create an encoded version of the coding block;

provide an indication in the header of the encoded bit-stream representative of the unencoded video frame that the encoded version of the coding block was created; and provide the encoded version of the coding block in the video data payload of the encoded bit-stream representative of the unencoded video frame;

in response to determining the coding block is to be further divided:

divide the coding block along at least one of a horizontal transverse axis and a vertical transverse axis, thereby creating a plurality of new coding blocks;

provide an indication in the header of the encoded bit-stream representative of the unencoded video frame that the coding block was further divided; and set the plurality of new coding blocks as the coding block for recursive processing; and wherein the frame header data portion of the header of the encoded bit-stream representative of the unencoded video frame includes a maximum coding-block-size flag having a value for signaling to a decoding device that the encoded bit-stream representative of the unencoded video frame has been generated using the maximum coding-block size.

11. The encoding device of claim 10, wherein horizontal dimension of the maximum coding-block size is sixty four pixels and the vertical dimension of the maximum coding-block size is sixty four pixels.

12. The encoding device of claim 10, wherein horizontal dimension of the maximum coding-block size is one hundred and twenty eight pixels and the vertical dimension of the maximum coding-block size is one hundred and twenty eight pixels.

* * * * *